United States Patent
Shimoda et al.

(10) Patent No.: US 10,254,175 B2
(45) Date of Patent: Apr. 9, 2019

(54) TEMPERATURE DETECTION MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroki Shimoda, Yokkaichi (JP); Shinichi Takase, Yokkaichi (JP); Nobuyuki Matsumura, Yokkaichi (JP); Yoshinori Ito, Yokkaichi (JP); Hideo Takahashi, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/074,523

(22) PCT Filed: Jan. 23, 2017

(86) PCT No.: PCT/JP2017/002061
§ 371 (c)(1),
(2) Date: Aug. 1, 2018

(87) PCT Pub. No.: WO2017/135076
PCT Pub. Date: Aug. 10, 2017

(65) Prior Publication Data
US 2019/0041273 A1 Feb. 7, 2019

(30) Foreign Application Priority Data
Feb. 1, 2016 (JP) .................. 2016-016873

(51) Int. Cl.
G01K 1/08 (2006.01)
G01K 7/22 (2006.01)
(Continued)

(52) U.S. Cl.
CPC ............... G01K 7/223 (2013.01); G01K 1/08 (2013.01); H01M 2/1077 (2013.01); H01M 2/202 (2013.01); H01M 10/486 (2013.01)

(58) Field of Classification Search
CPC .......... H01C 17/28; H01C 1/144; H01C 7/18; G01K 7/223; G01K 7/22
See application file for complete search history.

(56) References Cited

U.S. PATENT DOCUMENTS 6,152,776 A * 11/2000 Ikeda .................. H01M 2/1077
429/121
8,545,271 B2 * 10/2013 Henmi ................ H01M 2/1083
439/208

(Continued)

FOREIGN PATENT DOCUMENTS

JP H0945213 A 2/1997

OTHER PUBLICATIONS

International Search Report and Written Opinion for Application No. PCT/JP2017/002061 dated Feb. 28, 2017; 5 pages.

*Primary Examiner* — Kyung S Lee
(74) *Attorney, Agent, or Firm* — Reising Ethington, P.C.

(57) ABSTRACT

A temperature detection module includes a thermistor configured to detect the temperature of an electric cell, a thermistor electrical wire drawn from the thermistor, a thermistor holding portion configured to hold the thermistor movably in a direction in which the thermistor comes into contact with and separates from the electric cell in a form in which the thermistor is biased to move toward the electric cell, and an electrical wire routing path in which the thermistor electrical wire is routed in one direction. The electrical wire routing path is provided with a holding means for holding a midpoint of the thermistor electrical wire that is drawn from the thermistor and routed along the electrical wire routing path in a form in which a drawing end of the thermistor electrical wire is provided with an excess length portion having a predetermined length in order to allow movement of the thermistor.

5 Claims, 22 Drawing Sheets

(51) Int. Cl.
*H01M 10/48* (2006.01)
*H01M 2/20* (2006.01)
*H01M 2/10* (2006.01)

(56) References Cited

U.S. PATENT DOCUMENTS

| | | | |
|---|---|---|---|
| 9,083,095 B2* | 7/2015 | Takase | H01M 2/1077 |
| 9,564,661 B2* | 2/2017 | Okamoto | H01M 2/206 |
| 2002/0098734 A1* | 7/2002 | Ikeda | H01M 2/1077 |
| | | | 439/500 |
| 2006/0022522 A1* | 2/2006 | Plummer | B60R 16/0238 |
| | | | 307/9.1 |
| 2007/0018612 A1* | 1/2007 | VanLuvanee, Jr. | H01M 2/206 |
| | | | 320/116 |
| 2013/0161053 A1* | 6/2013 | Okamoto | H01M 2/206 |
| | | | 174/68.1 |
| 2014/0295225 A1* | 10/2014 | Okamoto | H01M 2/206 |
| | | | 429/65 |
| 2015/0056483 A1 | 2/2015 | Ogasawara et al. | |

* cited by examiner

TEMPERATURE DETECTION MODULE

CROSS REFERENCE TO RELATED APPLICATIONS

This application claims the priority of Japanese patent application JP2016-016873 filed on Feb. 1, 2016, the entire contents of which are incorporated herein.

TECHNICAL FIELD

The technology disclosed in this specification relates to a temperature detection module that is provided in an electricity storage module.

BACKGROUND ART

Battery modules obtained by connecting a plurality of electric cells side by side are used as power source apparatuses of electric automobiles and hybrid cars. In such battery modules, if the temperature of electric cells rises to a high temperature, the lifetime and the like of the electric cells are adversely affected, and thus a means has been devised in which the temperatures of the electric cells are monitored using a temperature detection module equipped with a thermistor, and a means disclosed in Patent Document 1 (JP2013-157123A) below is known, for example.

The temperature detection module includes a thermistor mounting member that is made of a synthetic resin and is provided with a plurality of thermistor holding portions and an electrical wire routing path, and has a structure in which a thermistor is accommodated in each of the thermistor holding portions in a form in which the thermistors are biased in a manner of elastic movement toward the electric cells, and thermistor electrical wires (lead wires) drawn from the thermistors are routed along the electrical wire routing path in one direction. When this temperature detection module is mounted on an upper surface of the battery module, the thermistors are elastically pressed against the corresponding electric cells, and the temperatures of the electric cells are individually detected as appropriate. Herein, drawing ends of the thermistor electrical wires that are drawn from the thermistors are provided with excess length portions so as to allow the movement of the thermistors.

SUMMARY

However, with a conventional means, the excess length portions provided at the drawing ends of the thermistor electrical wires are in a free state, that is, they are not managed, and thus, in a case where the thermistor electrical wires are pulled accidentally or the like, for example, there is a risk that the thermistor electrical wire will lose an excess length and tensile force from the electrical wires will be applied to the thermistor, and a failure such as an insufficient pressure for contact with the electric cell will occur, and thus there is a serious demand for a countermeasure for this.

The technology disclosed in this specification has been achieved based on the above-described circumstances.

The technology disclosed in this specification is a temperature detection module that is to be mounted on a power storage element group obtained by connecting a plurality of power storage elements side-by-side, and the temperature detection module includes a thermistor configured to be brought into contact with a power storage element among the power storage elements and detect a temperature of the power storage element; a thermistor electrical wire that is drawn from the thermistor; a thermistor holding portion configured to hold the thermistor movably in a direction in which the thermistor comes into contact with and separates from the power storage element in a form in which the thermistor is biased to move toward the power storage element; and an electrical wire routing path in which the thermistor electrical wire is routed in one direction, in which the electrical wire routing path is provided with a holding means for holding a midpoint of the thermistor electrical wire that is drawn from the thermistor and is routed along the electrical wire routing path in a form in which a drawing end of the thermistor electrical wire is provided with an excess length portion having a predetermined length in order to allow movement of the thermistor.

Because the midpoint of the thermistor electrical wire is held on the electrical wire routing path by the holding means, even if a tensile force is applied to the thermistor electrical wire, the tensile force is blocked at the held portion, and the excess length portion provided at the drawing end of the thermistor electrical wire is not influenced, and the constant length thereof is ensured. The movement amount of the thermistor that is required for the thermistor to come into contact with and separate from the power storage element is reliably absorbed by the excess length portion, and thereby it is possible to secure movement of the thermistor without subjection to a load from the thermistor electrical wire, and as a result of this, it is possible to obtain a stable contact pressure when the thermistor comes into contact with the power storage element.

Also, the following configurations may be employed.

The thermistor electrical wire is routed in a form in which the thermistor electrical wire is drawn from a peripheral surface of the thermistor in a direction away from the electrical wire routing path, and then folded toward the electrical wire routing path.

The thermistor is brought into contact with the power storage element while the folded portion of the thermistor electrical wire undergoes elastic deformation, and the thermistor receives a restoring elastic force of this folded portion and is firmly pressed against the power storage element. It is possible to achieve a more stable contact state between the thermistor and the power storage element.

The holding means is configured by binding the midpoint of the thermistor electrical wire routed in the electrical wire routing path with a binding tool, and providing the electrical wire routing path with a restriction portion configured to engage with the binding tool and restrict movement of the binding tool along the electrical wire routing path.

Engagement between the binding tool and the restriction portion holds the midpoint of the thermistor electrical wire on the electrical wire routing path. The holding operation can be easily performed.

The thermistor holding portion is provided with a temporary latching portion configured to latch the drawing end of the thermistor electrical wire in a manner of being capable of being unlatched in a form in which the drawing end is pulled back toward the thermistor.

When the thermistor is held by the thermistor holding portion and the thermistor electrical wire drawn from the thermistor is routed in the electrical wire routing path, the drawing end of the thermistor electrical wire is latched on the temporary latching portion provided in the thermistor holding portion in a form in which the drawing end of the thermistor electrical wire is pulled back toward the thermistor and is routed in the electrical wire routing path, and thereby the midpoint is held. Thereafter, when the drawing end of the thermistor electrical wire that is latched on the temporary latching portion is moved away therefrom, the moved portion becomes loose, and an excess length portion is formed at the loose portion. An excess length portion with a constant length can be reliably formed with a simple operation.

The thermistor electrical wire drawn from the thermistor mounted on an exit side of the electrical wire routing path is routed in a form of being provided with a folded portion in which the thermistor electrical wire faces an entrance side of the electrical wire routing path and is then folded toward the exit side at a midpoint, and the midpoint of a portion of the thermistor electrical wire that is routed toward the entrance side of the electrical wire routing path is held by the holding means.

When a tensile force is applied to the thermistor electrical wire, the tensile force is reduced while the folded portion deforms. An excess load is prevented from being applied to the position at which the thermistor electrical wire is held.

According to the technology disclosed in this specification, it is possible to ensure an excess length portion with an appropriate length at the drawing ends of the thermistor electrical wires that are drawn from the thermistors, and to secure smooth movement of the thermistors.

DESCRIPTION OF EMBODIMENTS

Embodiments

An embodiment will be described based on FIGS. 1 to 22. As shown in FIGS. 1 to 4, a battery module BM includes an electric cell group 10 in which a plurality of electric cells 11 (one example of power storage elements) each having a positive electrode terminal 12 and a negative electrode terminal 12 are arranged side-by-side, and the electrode terminals 12 (positive electrode and negative electrode) of adjacent electric cells 11 are successively connected using bus bars (not shown), and thereby this battery module BM is formed.

A temperature detection module HM according to the present embodiment is mounted on an upper surface of the above-described electric cell group 10.

Figure 1:
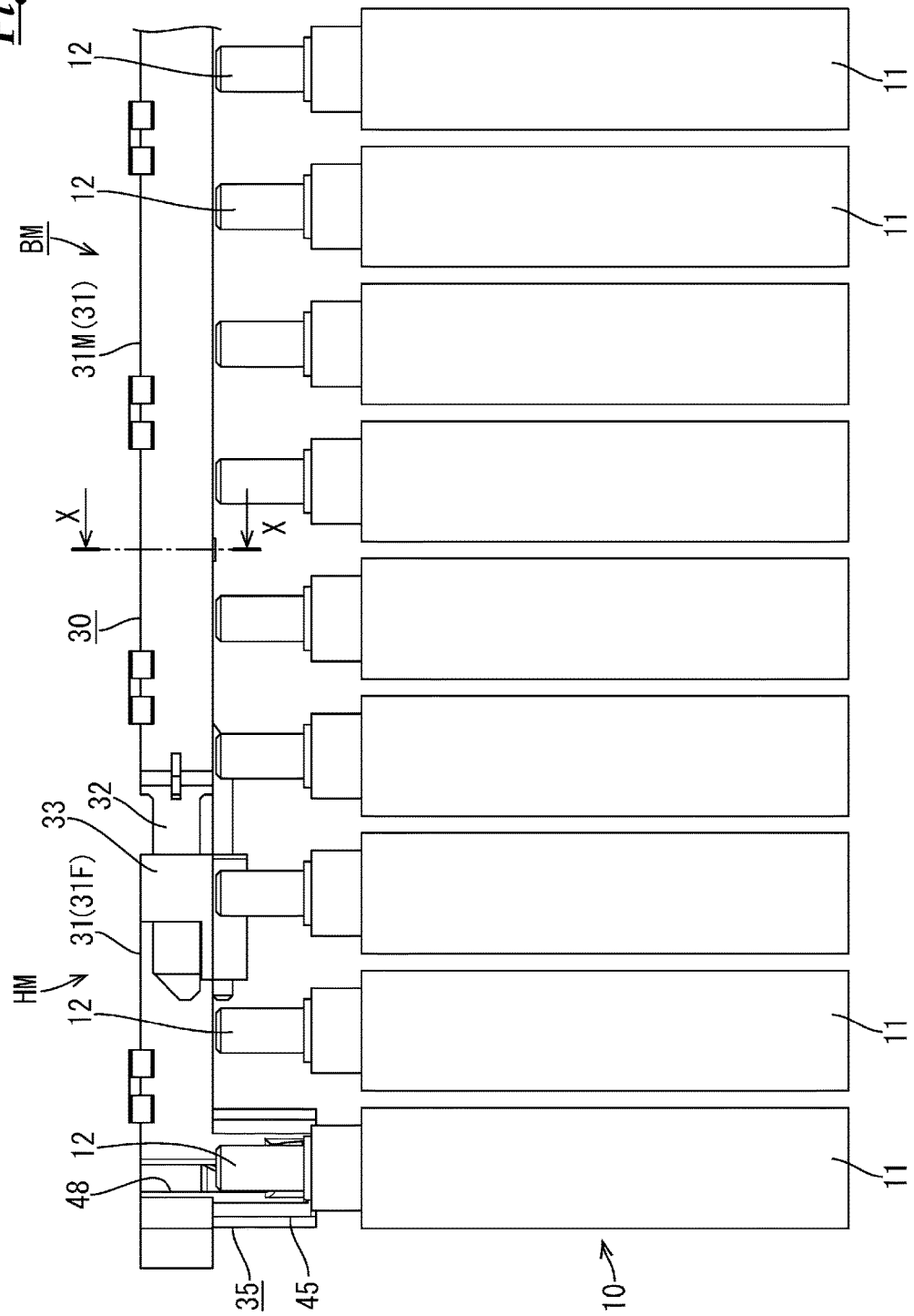
FIG. 1 is a front view showing a front portion of an electric cell group in a state in which a temperature detection unit according to an embodiment is mounted.
Figure 2:
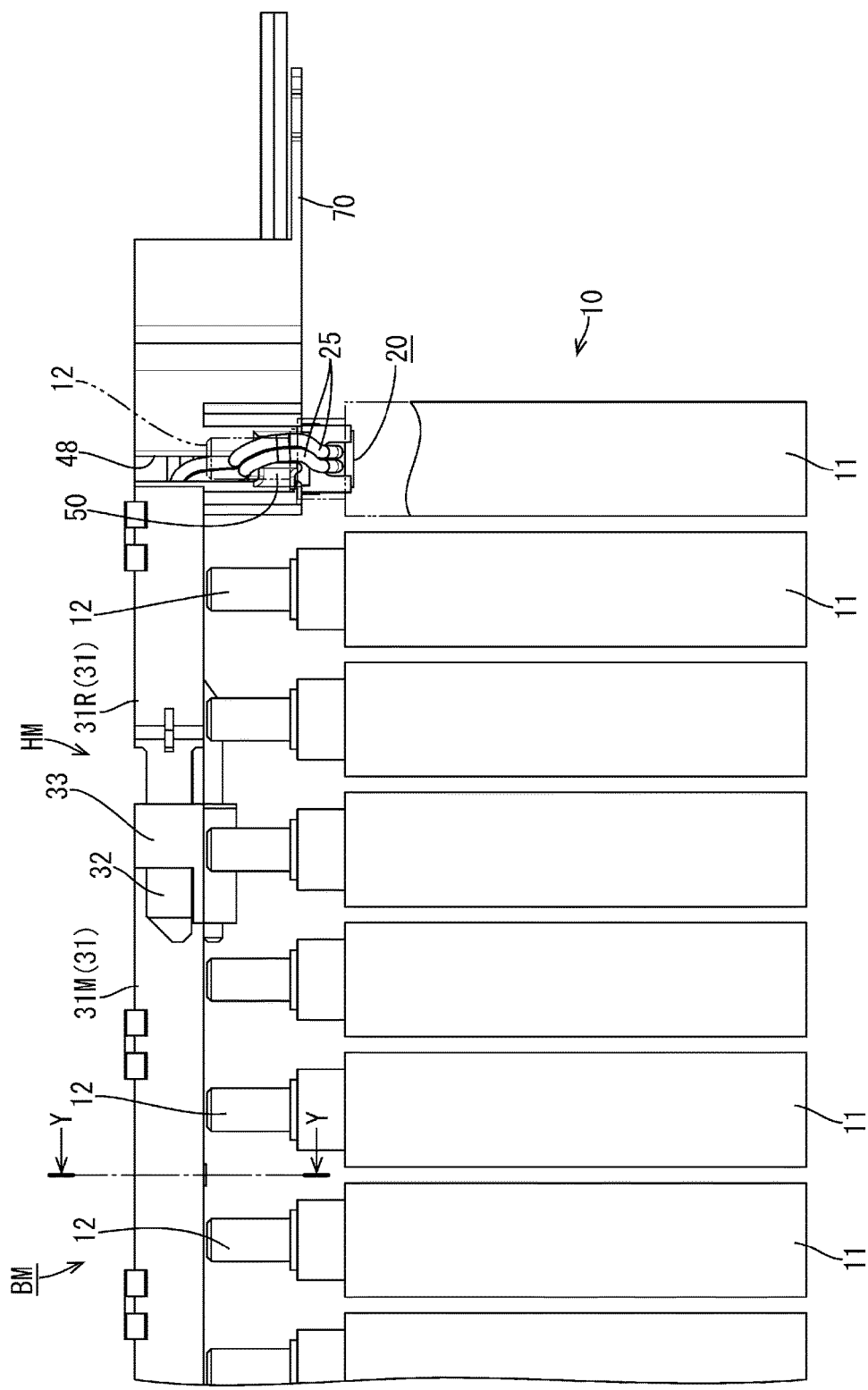
FIG. 2 is a front view showing a rear portion of the electric cell group.
Figure 3:
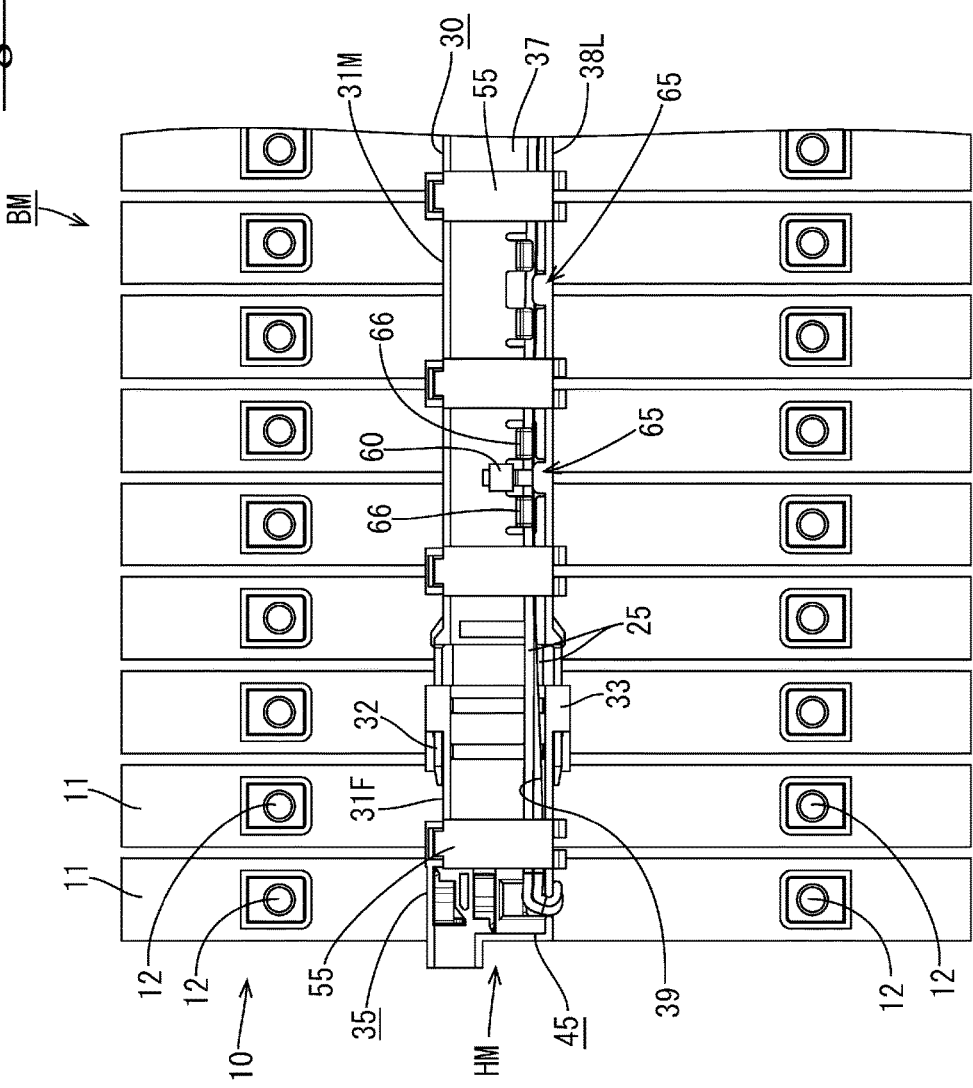
FIG. 3 is a plan view of a front portion of the electric cell group.
Figure 4:
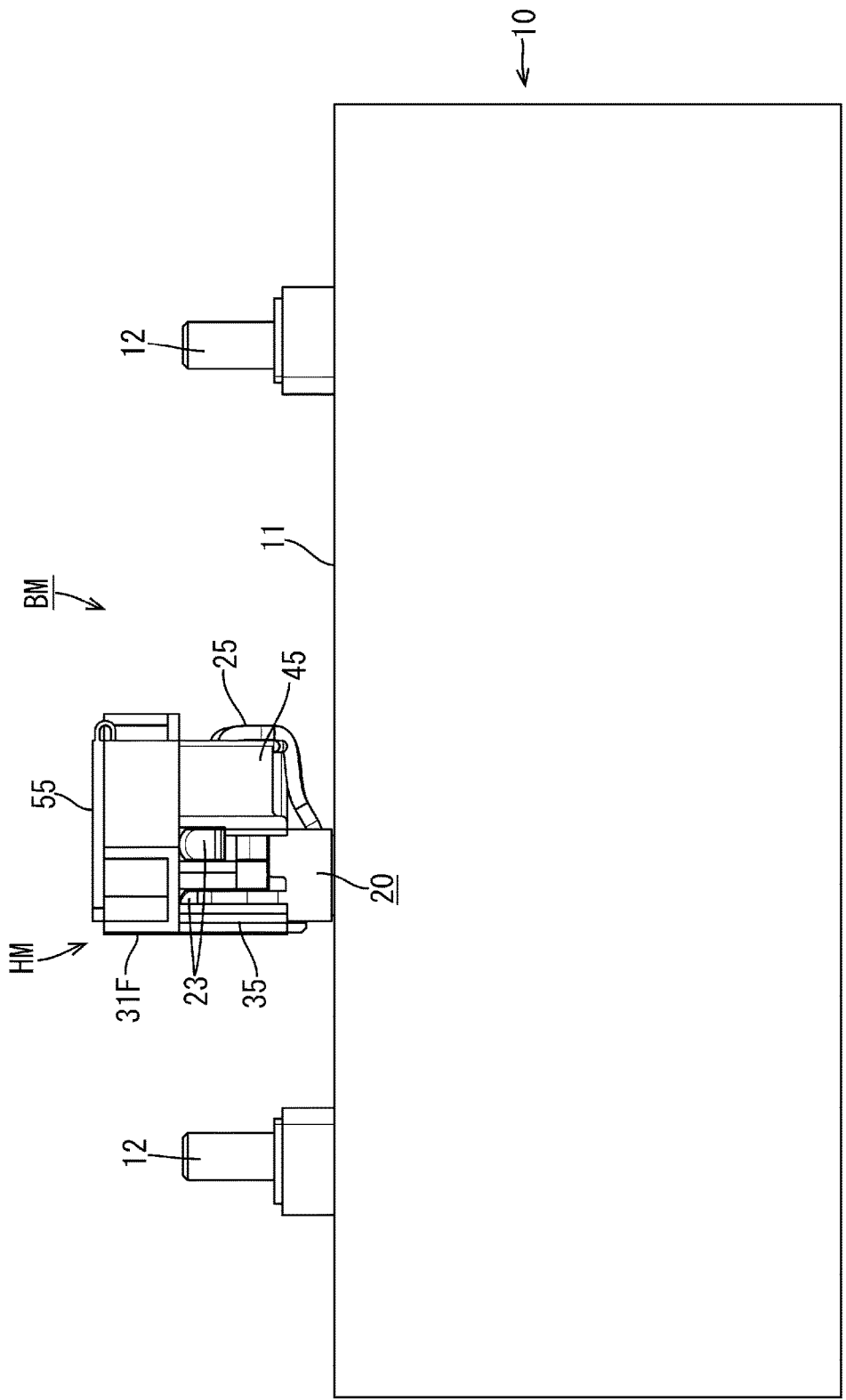
FIG. 4 is a side view of the front portion of the electric cell group.

As shown in FIG. 3, the temperature detection module HM is configured including a thermistor mounting member 30 (simply referred to as "mounting member 30" hereinafter) made of a synthetic resin and a plurality of thermistors 20 (see FIG. 9) that are mounted on this mounting member 30, and is arranged extending over the full length of the upper surface of the electric cell group 10 at a substantially central width position.

Figure 9:
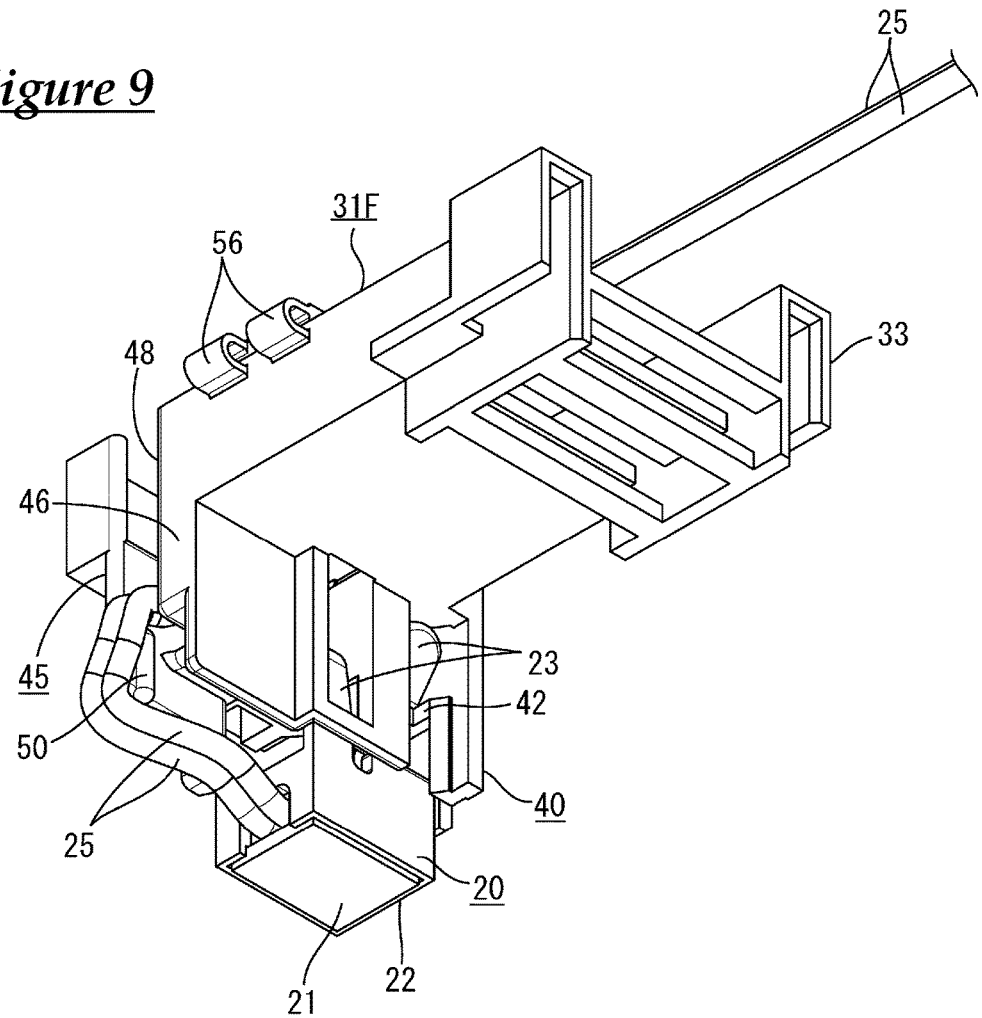
FIG. 9 is a perspective view showing a state in which the thermistor is first mounted on the front member.

As shown in FIG. 9, the thermistor 20 has a rectangular parallelepiped shape in which an element 21 is accommodated in a frame-shaped case 22, and has a structure in which a pair of thermistor electrical wires 25 (lead wires) are drawn from one side surface of the thermistor 20. Also, the upper surface of the thermistor 20 is provided with biasing springs 23 in a form integrated with the case 22.

As described above, the overall mounting member 30 has a shallow channel shape having a length extending over the full length of the electric cell group 10.

Figure 5:
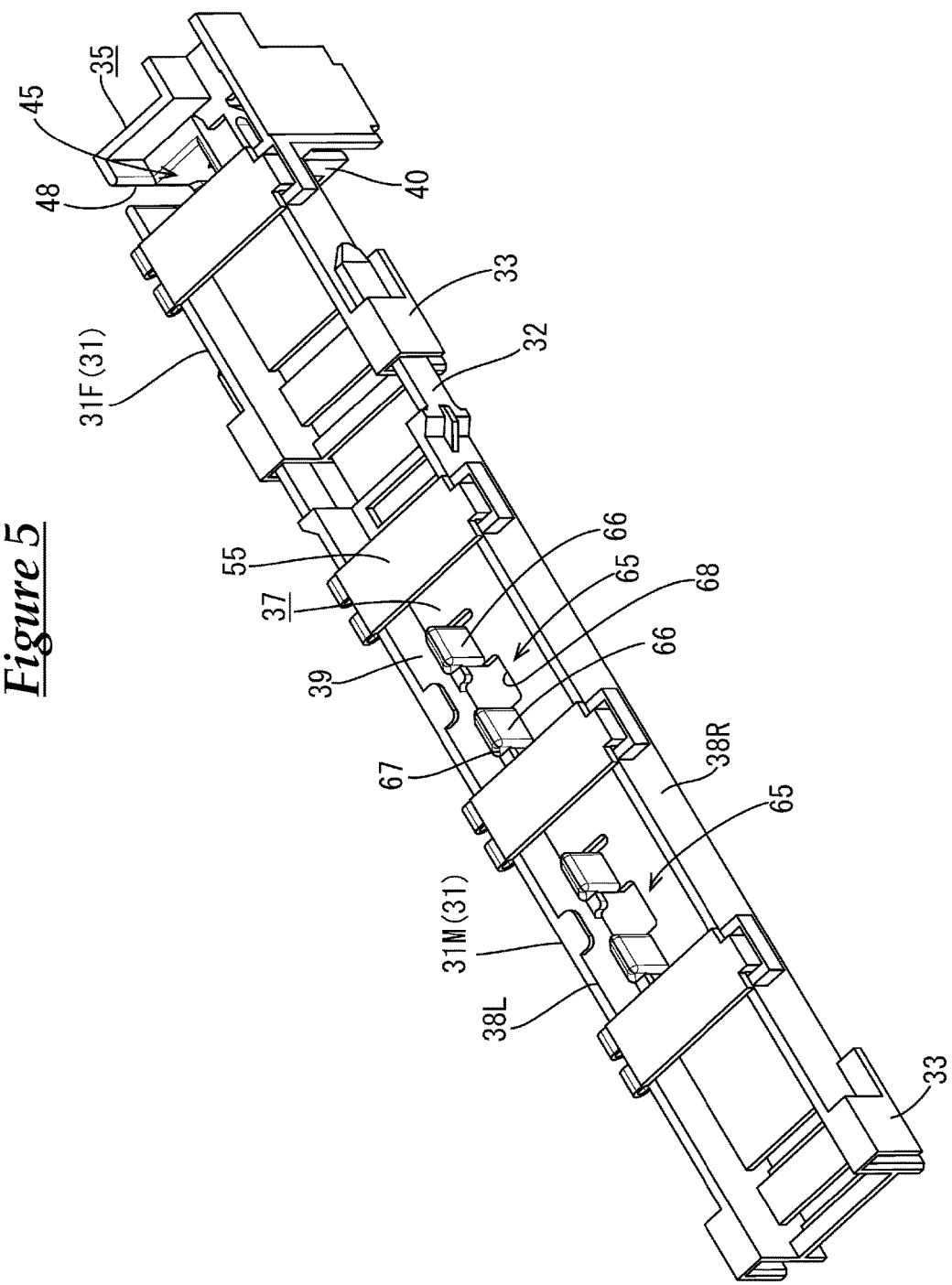
FIG. 5 is a perspective view showing a state in which two front division mounting members are linked.
Figure 19:
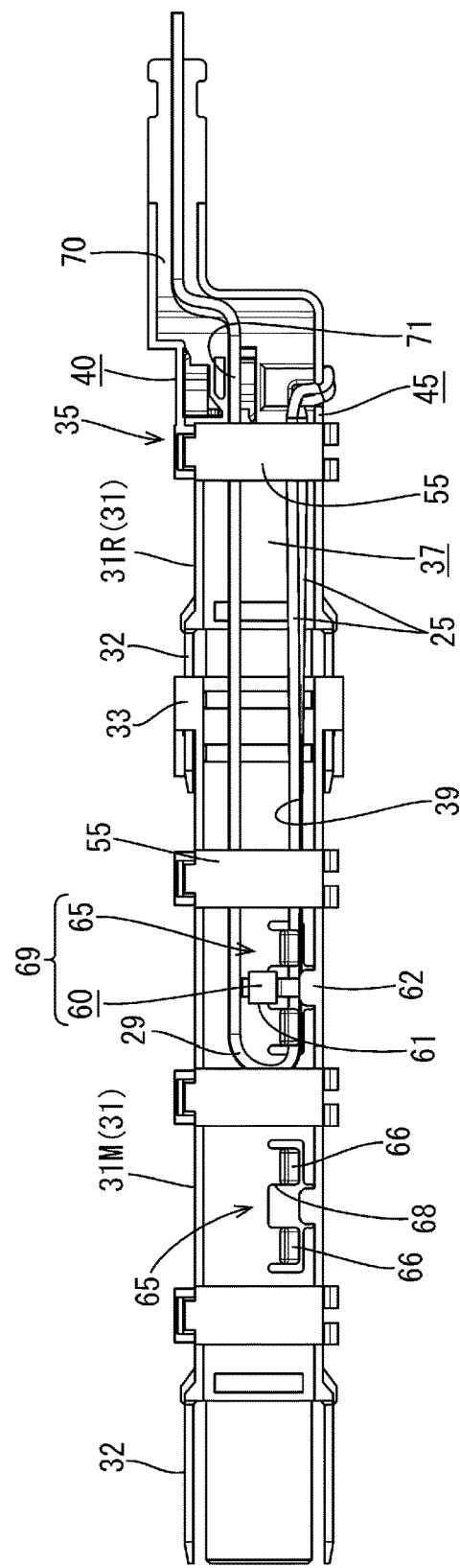
FIG. 19 is a plan view showing a state in which mounting of the thermistor on two rear division mounting members and routing of the thermistor electrical wires are complete.
Figure 20:
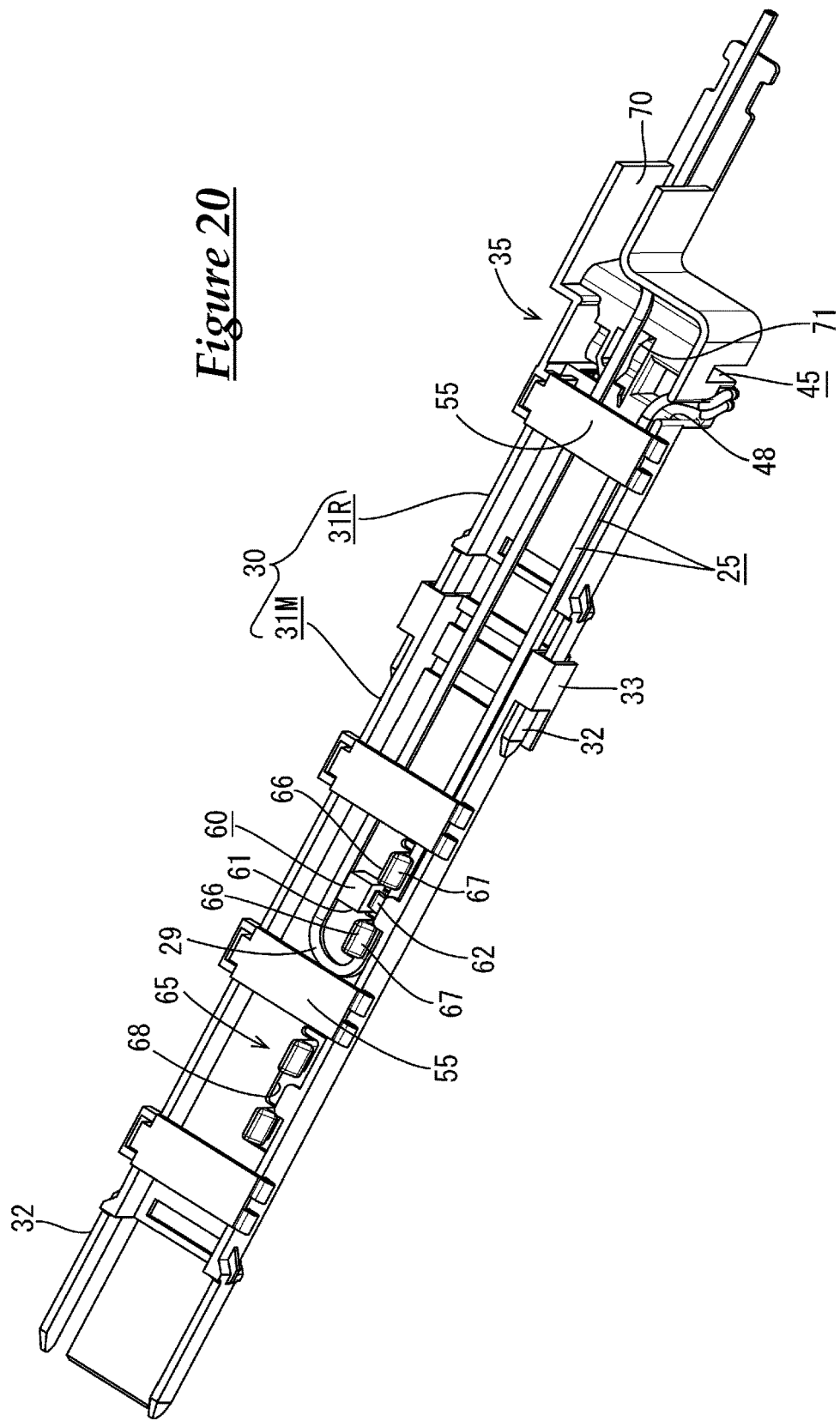
FIG. 20 is a perspective view of the state according to FIG. 19 viewed from above.
Figure 21:
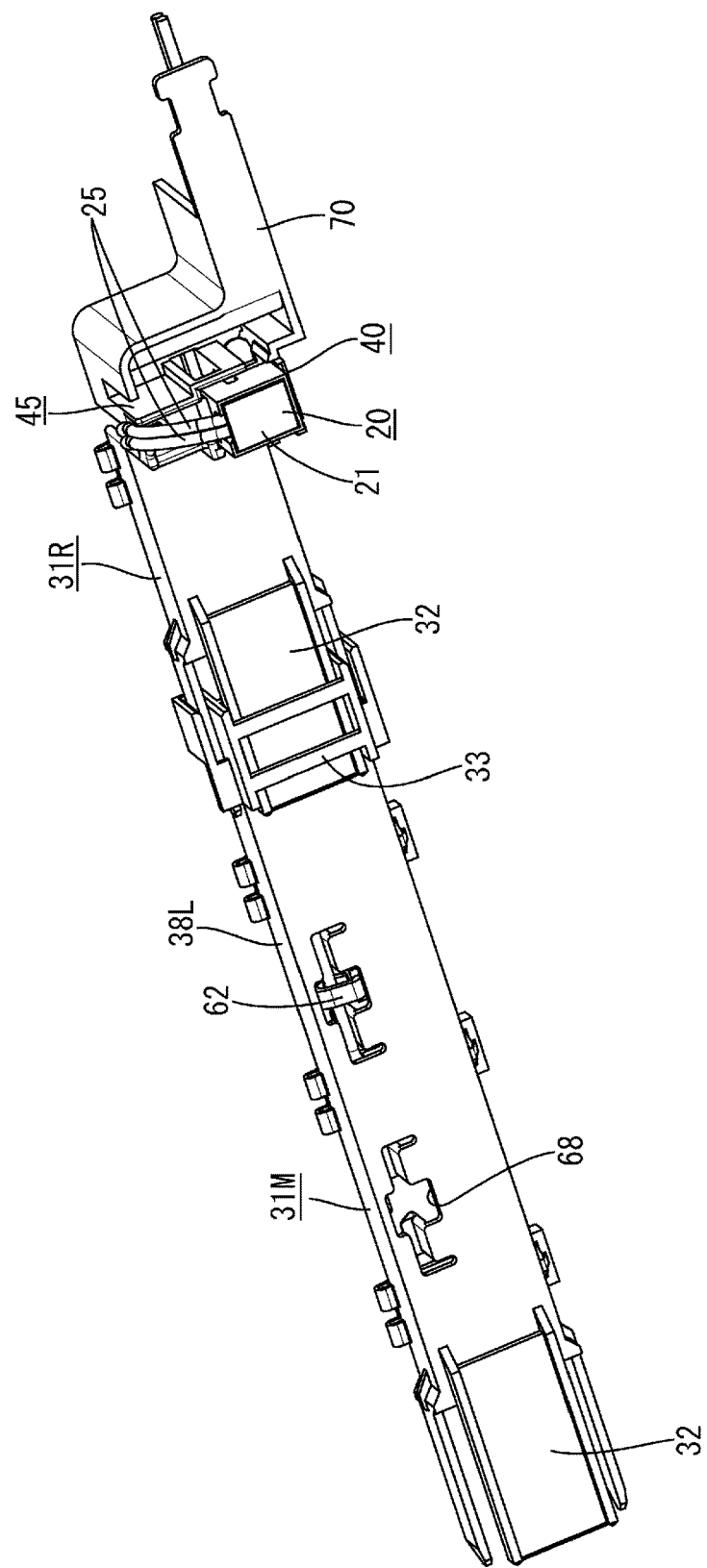
FIG. 21 is a perspective view of the state according to FIG. 19 viewed from below.
Figure 22:
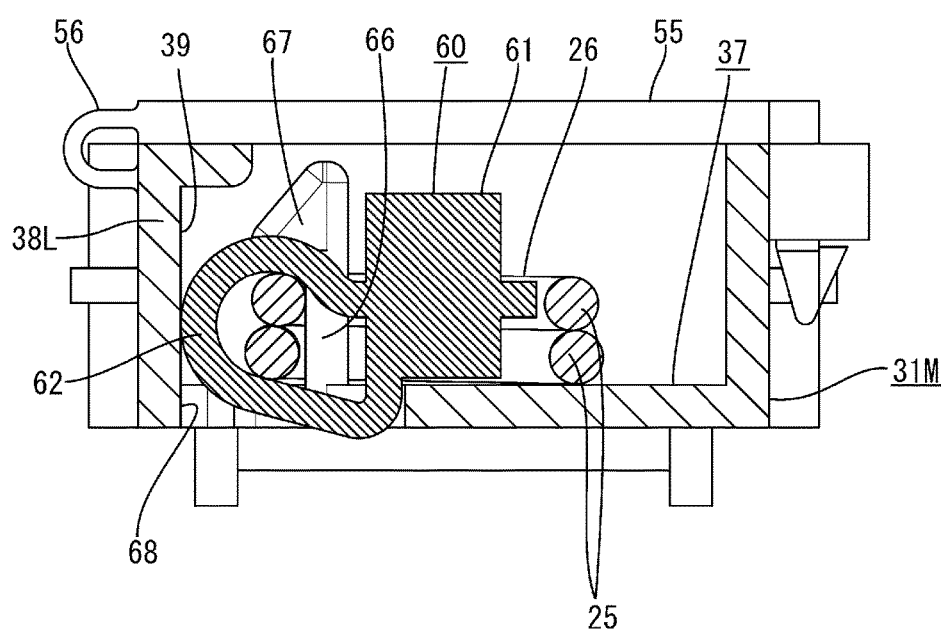
FIG. 22 is an enlarged cross-sectional view taken along line Y-Y in FIG. 2.

As shown in FIGS. 5 and 19, specifically, the mounting member 30 is formed by connecting a plurality of division mounting members 31 in series. The division mounting members 31 include a front member 31F arranged at a front end of the mounting member 30, a rear member 31R arranged at a rear end, and middle members 31M arranged therebetween, and an appropriate number of division mounting members 31 are connected to each other in accordance with the full length of the electric cell group 10, that is, the number of electric cells 11.

The mounting member 30 of this embodiment is formed by linking four division mounting members 31 in total, namely, the front member 31F, two middle members 31M (having the same shape), and the rear member 31R. The division mounting members 31 are successively linked by inserting an engagement portion 32 formed at one of protruding edges of adjacent division mounting members 31 into an engagement reception portion 33 formed at the other, and the mounting member 30 described above is thus formed.

The overall mounting member 30 is provided with a plurality of thermistor holding portions 35 in which the thermistors 20 are individually accommodated, at predetermined intervals along the length direction. In this embodiment, the front member 31F and the rear member 31R are each provided with one thermistor holding portion 35, and the middle members 31M are each provided with a plurality of (two, for example) thermistor holding portions 35. Note that the thermistor holding portions formed in the middle members 31M are not shown.

Also, as described above, the mounting member 30 has a channel shape, and thus the inner portion of the mounting member 30 serves as the electrical wire routing path 37 in which the thermistor electrical wires 25 drawn from the thermistors 20 are routed in one direction (rightward in FIG. 3). Basically, the thermistor electrical wires 25 are routed along the inner side of a left wall 38L (bottom of FIG. 3) (routing path 39).

A structure of the mounting member 30 will be described in detail.

Figure 6:
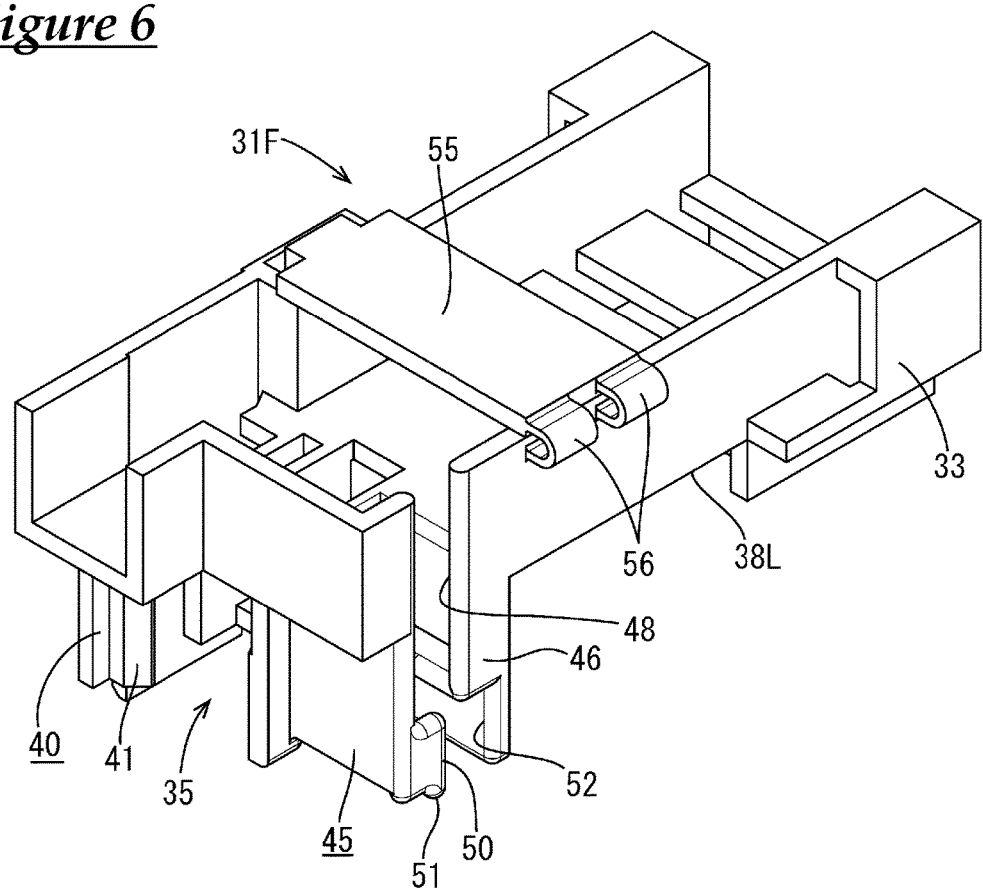
FIG. 6 is a perspective view of a front member.
Figure 7:
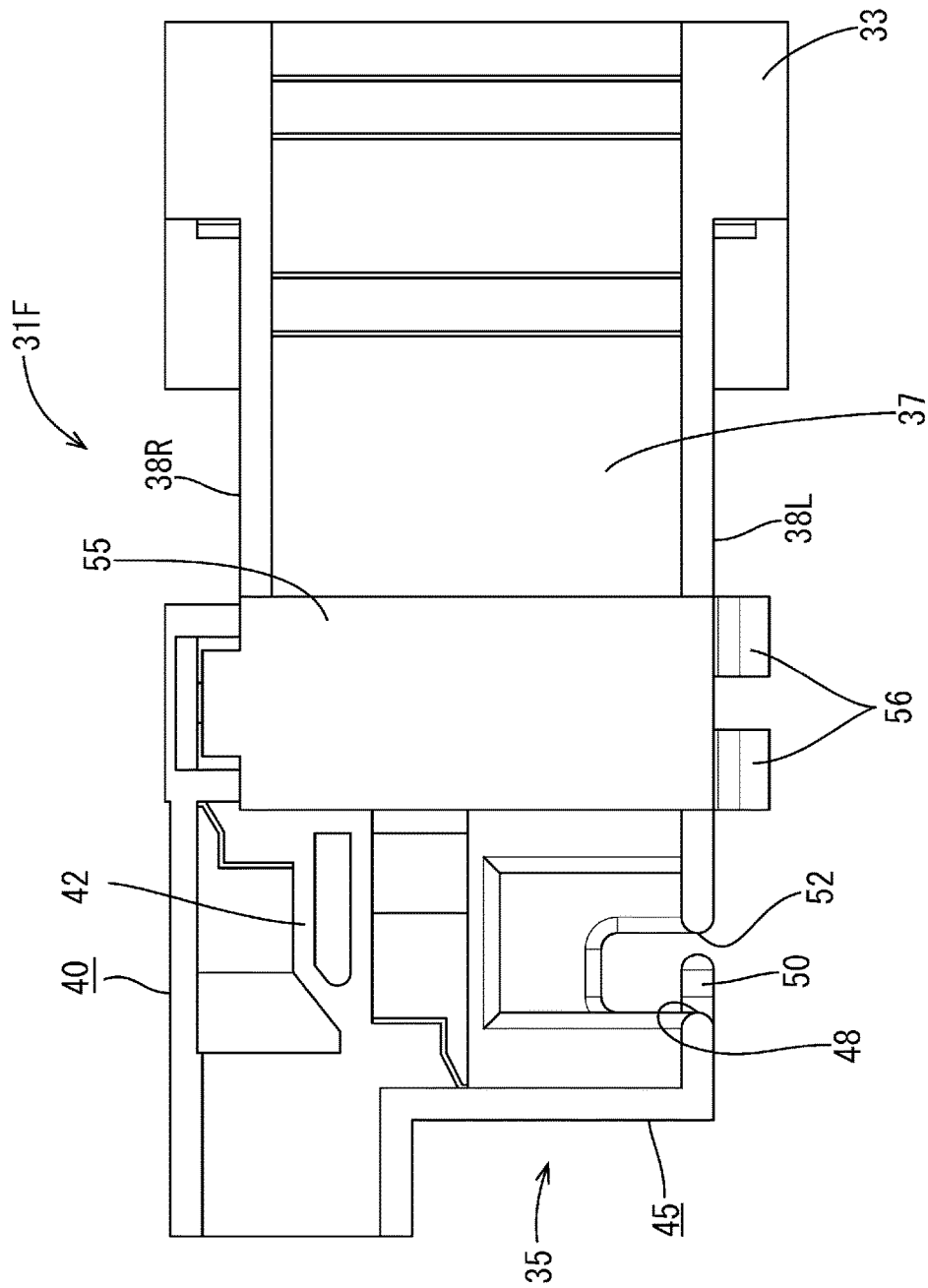
FIG. 7 is a plan view of the front member.

A structure of the front member 31F will be described with reference to FIGS. 6 to 8. The front end portion of the front member 31F is provided with the above-described thermistor holding portion 35 over its full width. The thermistor holding portion 35 has an approximately rectangular tubular shape with open upper and lower surfaces, and is formed so as to protrude downward from the bottom surface of the front member 31F.

A right side (top of FIG. 7) in the width direction of the thermistor holding portion 35 is an accommodation portion 40 for accommodating the thermistor 20, and a left side thereof is an electrical wire extension portion 45 for passage of the thermistor electrical wires 25 drawn from the thermistor 20, the electrical wire extension portion 45 guiding the thermistor electrical wires 25 toward a starting end of the above-described electrical wire routing path 37.

The accommodation portion 40 is provided with a guide 41 extending in the vertical direction to which at least four corners of the thermistor 20 are fit, and thus the thermistor 20 is accommodated in the accommodation portion 40 slidably in the vertical direction. Although not shown specifically, the upper portion of the accommodation portion 40 is provided with spring engagement portions 42 configured to engage with biasing springs 23 provided in the thermistor 20, and a majority of a lower portion of the thermistor 20 is always suspended and supported at a predetermined position protruding from a lower surface opening of the accommodation portion 40. Also, the thermistor 20 slides upward while causing the above-described biasing springs 23 to elastically contract, and a downward sliding force is applied to the thermistor 20 due to restoring elastic force.

Figure 8:
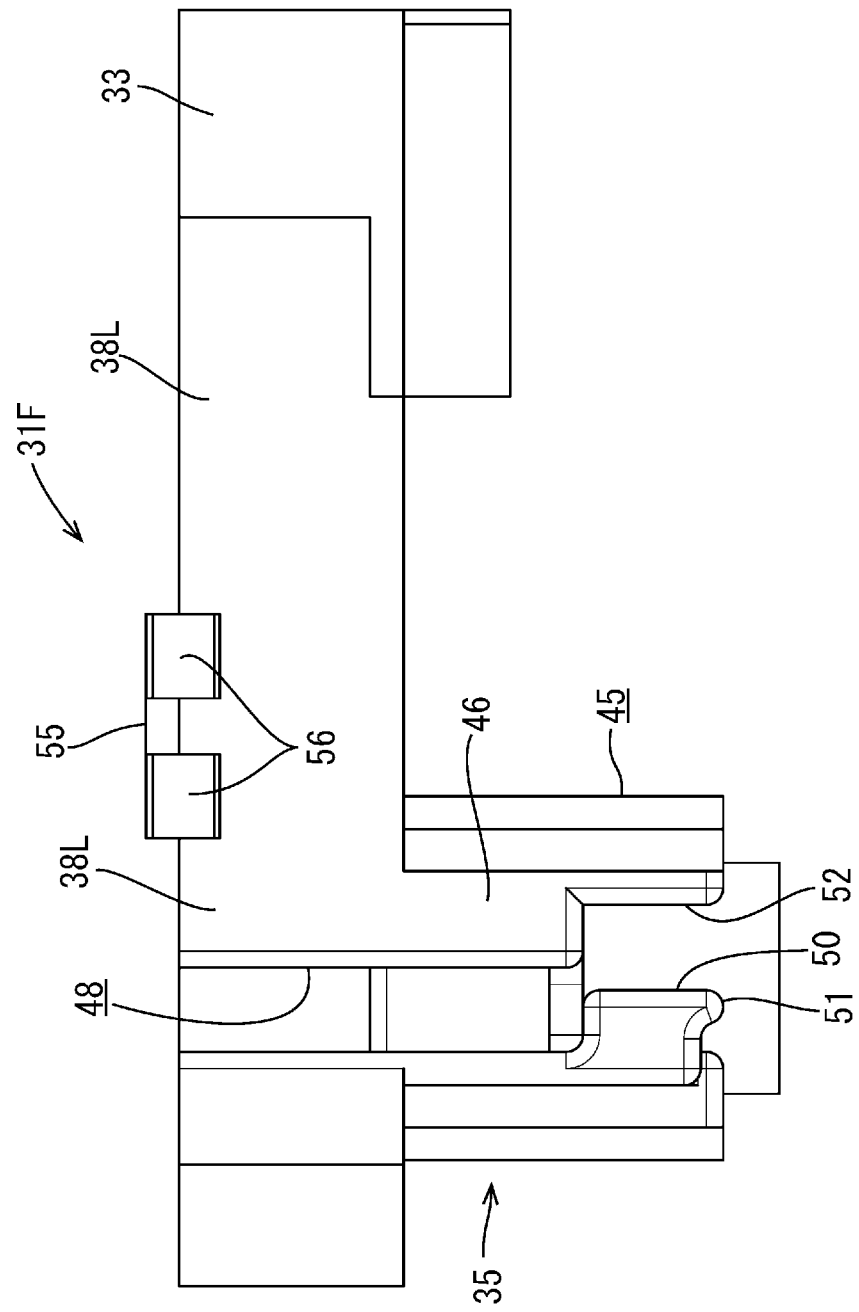
FIG. 8 is a front view of the front member.

A left wall 46 of the electrical wire extension portion 45 is continuous and flush with the left wall 38L of the front member 31F, and as shown in FIG. 8, an electrical wire insertion hole 48 for passage of the thermistor electrical wires 25 drawn from the above-described thermistor 20 is formed from the left wall 46 of the electrical wire extension portion 45 to the left wall 38L of the front member 31F in a vertical orientation with open upper and lower ends.

As shown in FIG. 8, a lower end portion at the left edge of the above-described electrical wire insertion hole 48 in a front view is provided with a temporary latching piece 50 having a predetermined width, the temporary latching piece projects toward a right edge. A projecting end at a lower edge of the temporary latching piece 50 is provided with a retaining protrusion 51.

On the other hand, a lower end portion 52 at the right edge that opposes the temporary latching piece 50 is formed retracted rightward by the projecting amount of this temporary latching piece 50, and a hole width that is the same as that of the upper portion is ensured.

A cover 55 having a belt shape extending across the upper ends of the left and right side walls 38L and 38R is provided at a rear position (rightward in FIG. 7) of the thermistor holding portion 35 in the front member 31F so as to swingably open and close via hinge portions 56. The cover 55 covers across the upper surface of the electrical wire routing path 37, and thereby achieves retaining of the routed thermistor electrical wires 25, and also functions as a reinforcement in order to prevent deformation of the front member 31F.

Next, a structure related to routing of the thermistor electrical wires 25 drawn from the thermistor 20 mounted on the front member 31F will be described.

Although the details will be described later, the thermistor electrical wires 25 extending from the electrical wire extension portion 45 in the thermistor holding portion 35 are routed along the routing path 39 located on the inner side of the left wall 38L in the mounting member 30.

Figure 16:
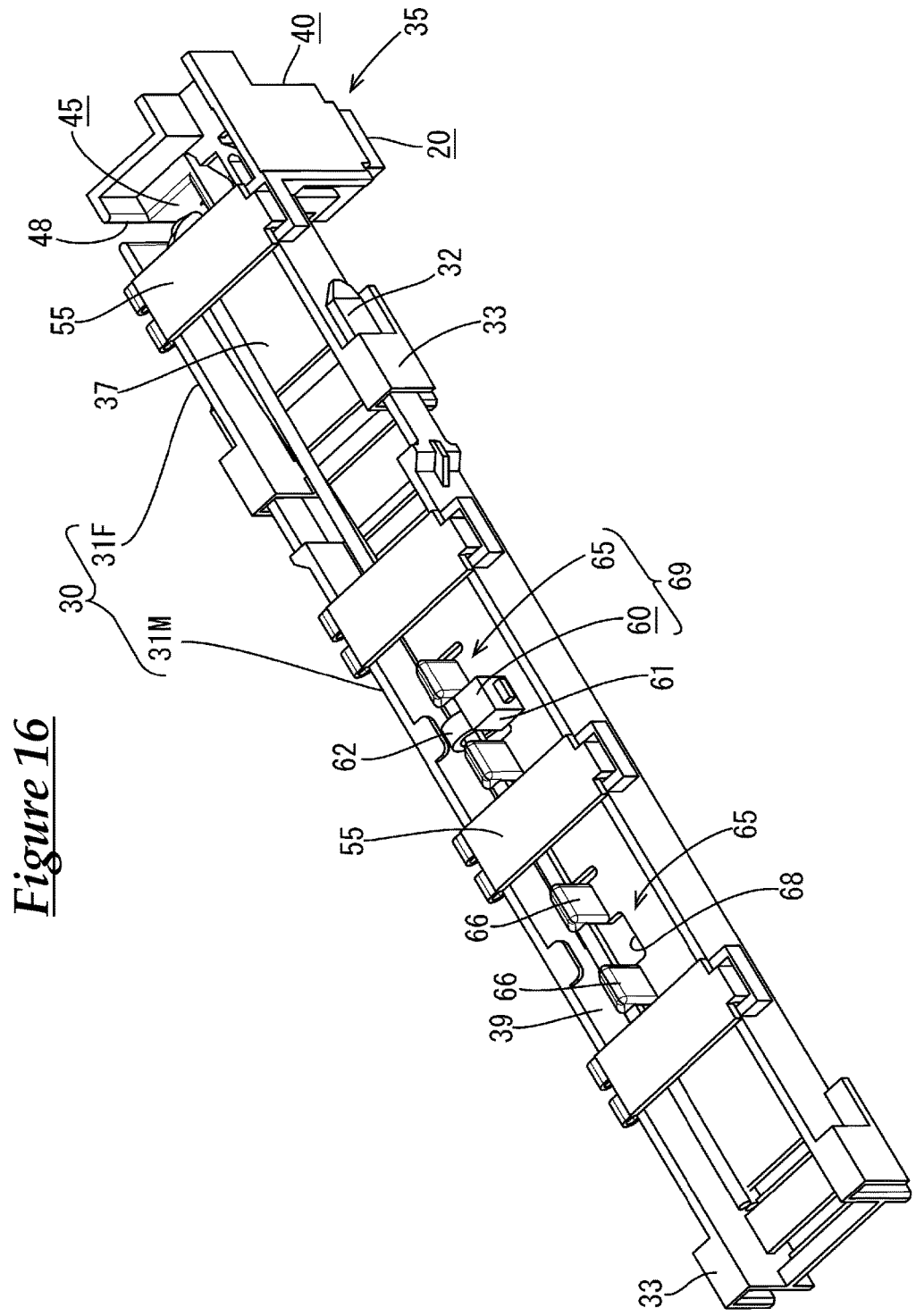
FIG. 16 is a perspective view that is viewed from above and shows a state in which mounting of the thermistor on two front division mounting members and routing of the thermistor electrical wires are complete.
Figure 17:
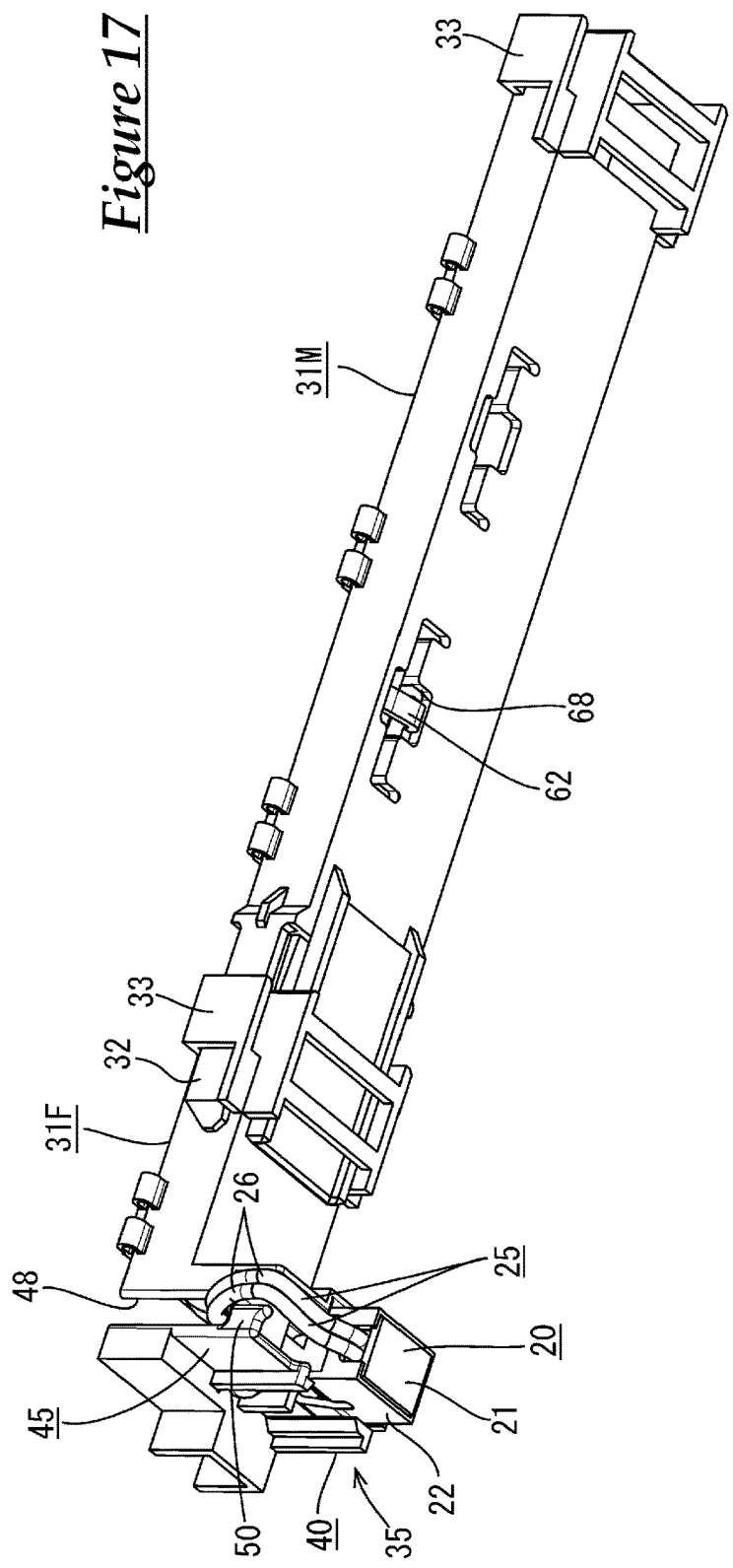
FIG. 17 is a perspective view of the state according to FIG. 16 viewed from below.
Figure 18:
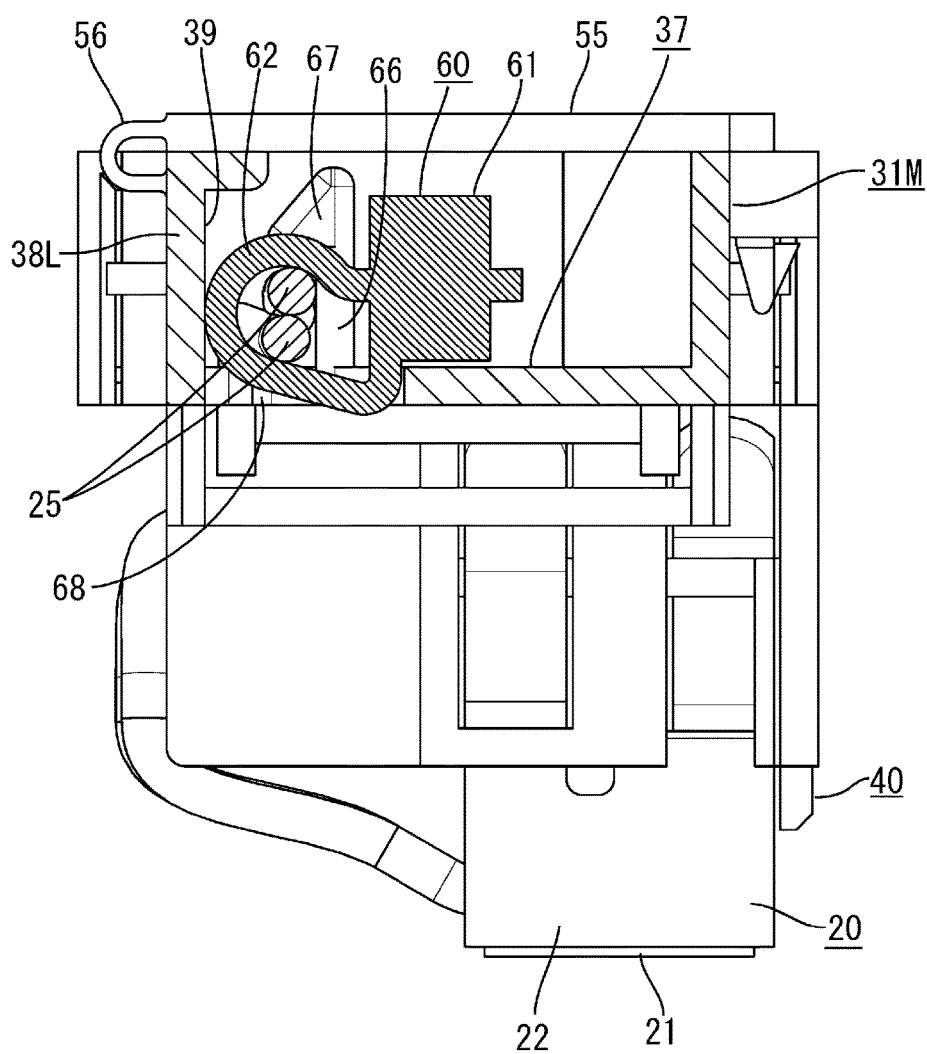
FIG. 18 is an enlarged cross-sectional view taken along line X-X in FIG. 1.

Herein, as shown in FIG. 16, any midpoint of the above-described thermistor electrical wires 25 is bound by a binding band 60. As shown in FIG. 18, an example of the binding band 60 is a binding band obtained by a band portion 62 that extends from a head portion 61 being wrapped around to bind the thermistor electrical wires 25, and then be returned to the head portion 61 and fixed.

On the other hand, as shown in FIG. 5, in the middle member 31M linked to the front member 31F, the routing path 39 located on the inner side of the left wall 38L is provided with electrical wire pressing portions 65 at two positions located apart from each other in a direction along the routing path 39. As shown in FIG. 18, each electrical wire pressing portion 65 has a structure in which two support columns 66 whose upper ends each have a hook 67 for pressing stand side-by-side with a constant interval therebetween at positions located a predetermined distance inward of the left wall 38L.

Here, the interval between the two support columns 66 in the electrical wire pressing portion 65 is an interval to the extent that the above-described binding band 60 can be held approximately tightly. Also, a bottom surface between the two support columns 66 has an escape hole 68 for fitting a portion of the binding band 60 (for example, the band portion 62 wound around the thermistor electrical wires 25) to escape.

A holding means 69 for holding predetermined midpoints of the thermistor electrical wires 25 on the electrical wire routing path 37 (routing path 39) is constituted by the above-described binding band 60 and electrical wire pressing portion 65 (see FIG. 16).

Note that the middle member 31M is provided with three covers 55, which are similar to those provided in the front member 31F, at intervals, and the above-described electrical wire pressing portions 65 are provided at intermediate positions between adjacent covers 55.

Next, a structure of the rear member 31R and a structure related to routing of the thermistor electrical wires 25 drawn from the thermistor 20 mounted on the rear member 31R will be described with reference to FIGS. 19 to 22.

As shown in FIG. 19, a middle length portion of the rear member 31R is provided with a thermistor holding portion 35 having the same structure as that of the above-described front member 31F. Herein, the electrical wire extension portion 45 of the thermistor holding portion 35 is continuous with a terminal end of the electrical wire routing path 37.

A rear end portion of the rear member 31R projects rightward (upward in FIG. 19) and thus the width thereof is widened, and a right end portion on a rear wall of this wide portion is provided with an outlet path 70 of the electrical wire routing path 37 that protrudes rearward. Note that a ceiling portion of the accommodation portion 40 in the thermistor holding portion 35 is provided with a guide path 71 for fitting and guiding the thermistor electrical wires 25.

Also, a similar cover 55 is arranged at a front position (left of FIG. 19) of the thermistor holding portion 35.

The middle member 31M is linked to a front end of this rear member 31R. As will be described later, this middle member 31M is utilized for routing the thermistor electrical wires 25 drawn from the thermistor 20 mounted on this rear member 31R, and the structure of the middle member 31M is the same as the middle member 31M connected to the front member 31F, and thus redundant description thereof will be omitted.

Examples of a procedure for assembling the temperature detection module HM and a procedure for mounting the temperature detection module HM according to this embodiment will be described below.

First, as described above, the mounting member 30 is formed by connecting the front member 31F, the two middle members 31M, and the rear member 31R in series. Thereafter, the thermistor 20 is mounted on this mounting member 30. Note that only the case where the thermistors 20 are mounted on the front member 31F and the rear member 31R will be described hereinafter, and mounting of the thermistors 20 on the middle members 31M will not be described.

As shown in FIGS. 9 to 12, in the case where the thermistor 20 is mounted on the front member 31F, the thermistor 20 is inserted into the accommodation portion 40 of the thermistor holding portion 35 from the bottom, with a drawing portion of the thermistor electrical wires 25 oriented frontward. At this time, by engaging the biasing springs 23 on the upper surface side of the thermistor 20 with the spring engagement portions 42 provided in the accommodation portion 40, the thermistor 20 is kept in a state in which the thermistor 20 protrudes from the lower surface opening of the accommodation portion 40 by a predetermined length while the thermistor 20 is biased downward by the biasing springs 23.

Figure 10:
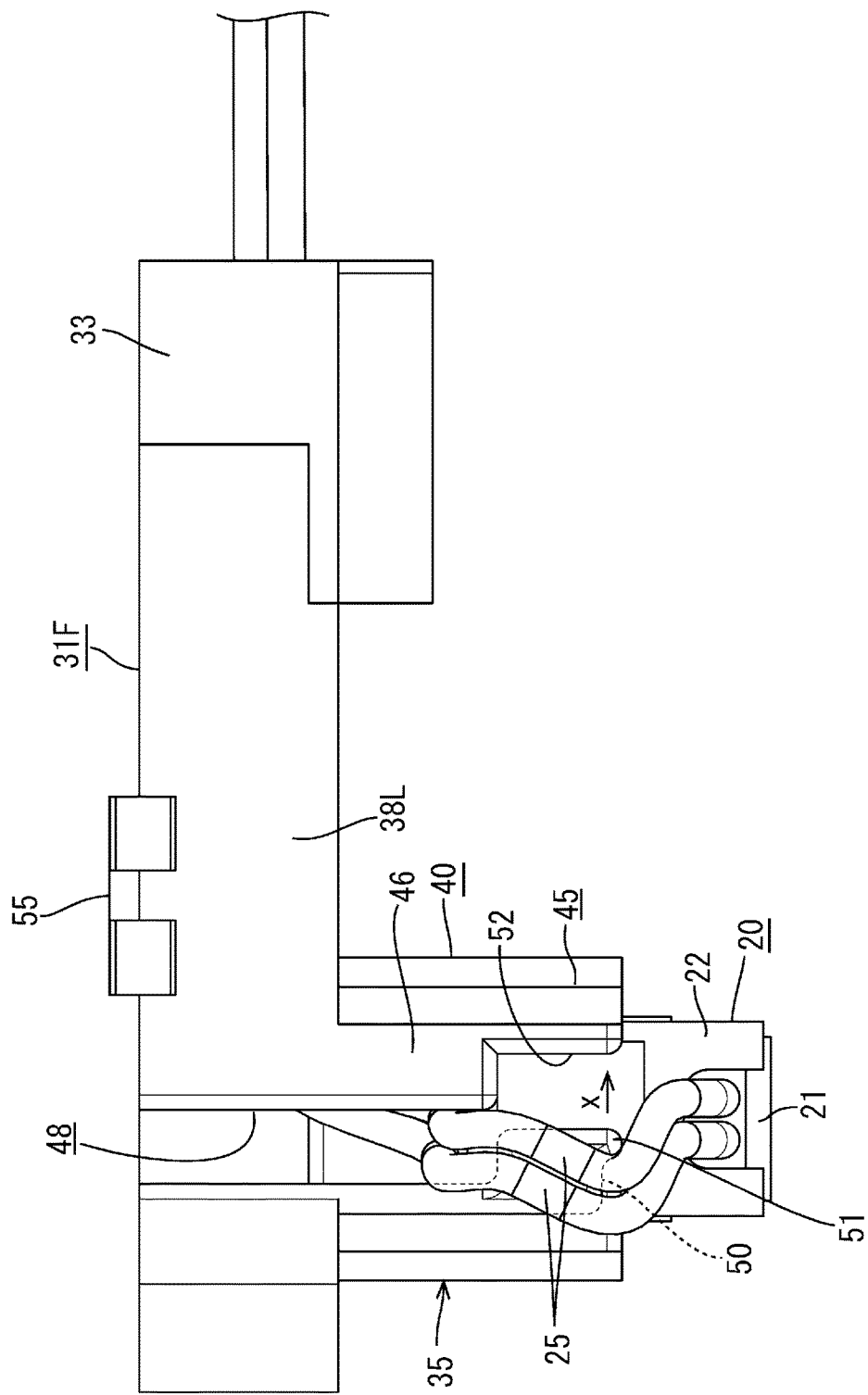
FIG. 10 is a front view of a state according to FIG. 9.
Figure 11:
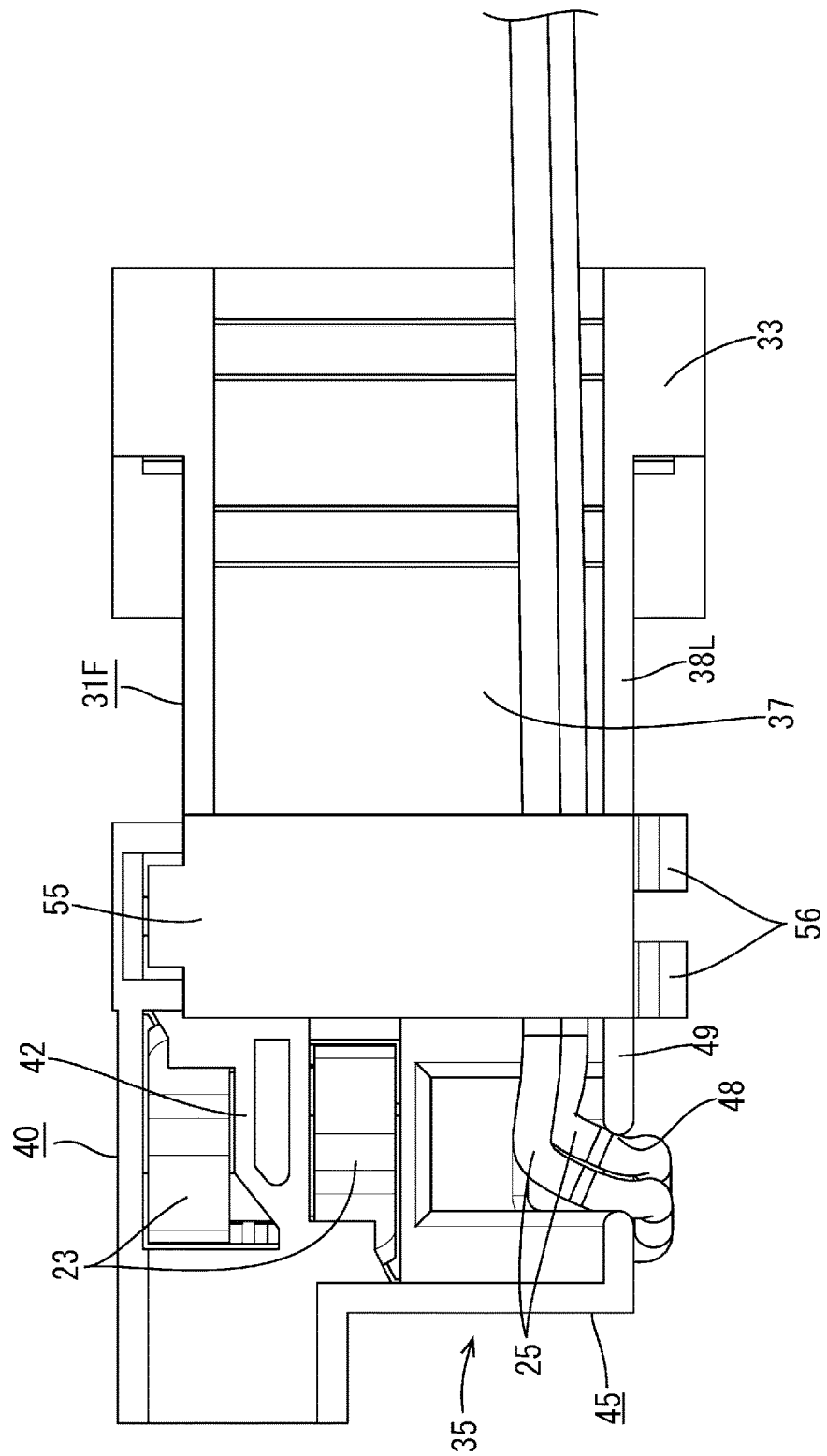
FIG. 11 is a plan view of the state according to FIG. 9.
Figure 12:
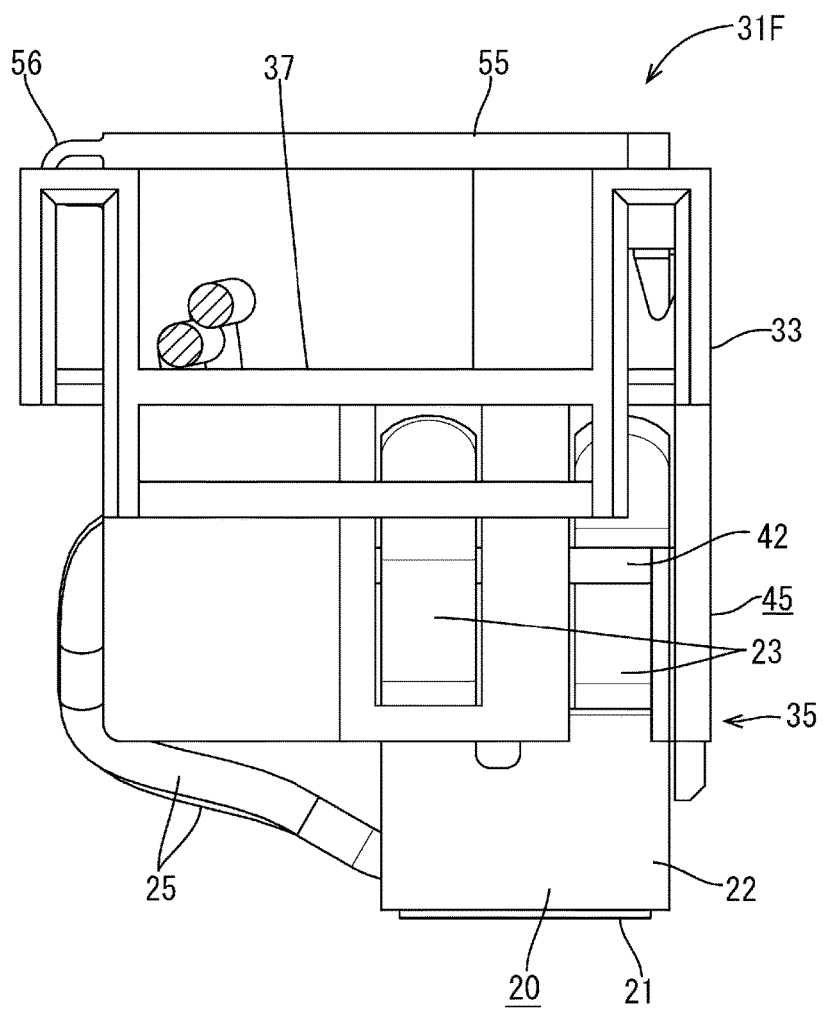
FIG. 12 is an enlarged side view of the state according to FIG. 9.

Next, after the thermistor electrical wires 25 drawn from the thermistor 20 are drawn frontward, as shown in FIG. 10, the thermistor electrical wires 25 are wrapped around a lower edge of the temporary latching piece 50 provided at a lower end at a left edge of the electrical wire insertion hole 48 and are bent upward. The thermistor electrical wires 25 that were bent upward are inserted into the electrical wire extension portion 45 so as to pass through the electrical wire insertion hole 48 passing through an opening at the upper end. Then, the thermistor electrical wires 25 are temporarily routed rearward so as to extend along the inner surface of the left wall 38L that extends from the front member 31F to the middle member 31M while the thermistor electrical wires 25 are made tense by being slightly pulled.

Thereafter, a position of the temporarily routed thermistor electrical wires 25 that corresponds to a predetermined electrical wire pressing portion 65 (on the right in FIG. 16) is bound by the binding band 60. Then, by pushing the thermistor electrical wires 25 between the left wall 38L and those electrical wire pressing portions 65 as well as the electrical wire pressing portions 65 located rearward thereof, and fitting that binding band 60 (rounded band portion 62) between the two support columns 66 of the electrical wire pressing portion 65, the thermistor electrical wires 25 are routed rearward along the routing path 39 located on the inner side of the left wall 38L in a state in which the thermistor electrical wires 25 are retained. Then, although not shown, the thermistor electrical wires 25 are routed in the electrical wire routing path 37 extending from the next middle member 31M to the rear member 31R, and are drawn through the outlet path 70 provided at a rear edge of the rear member 31R to the outside.

Figure 13:
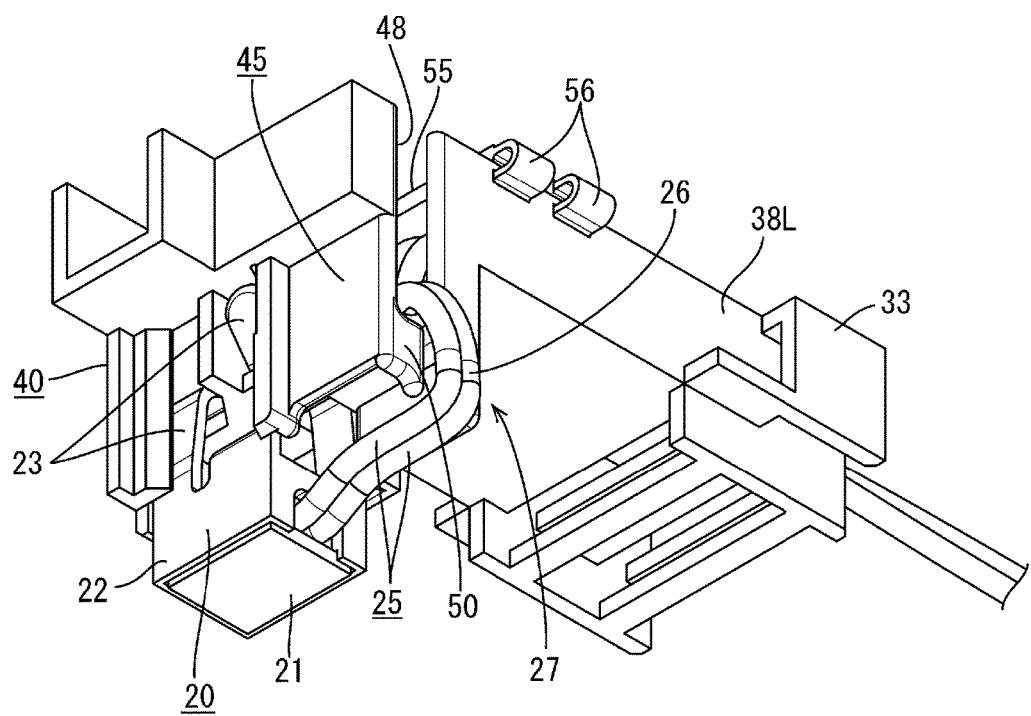
FIG. 13 is a perspective view showing a state in which the thermistor electrical wires are moved away from a temporary latching piece.
Figure 14:
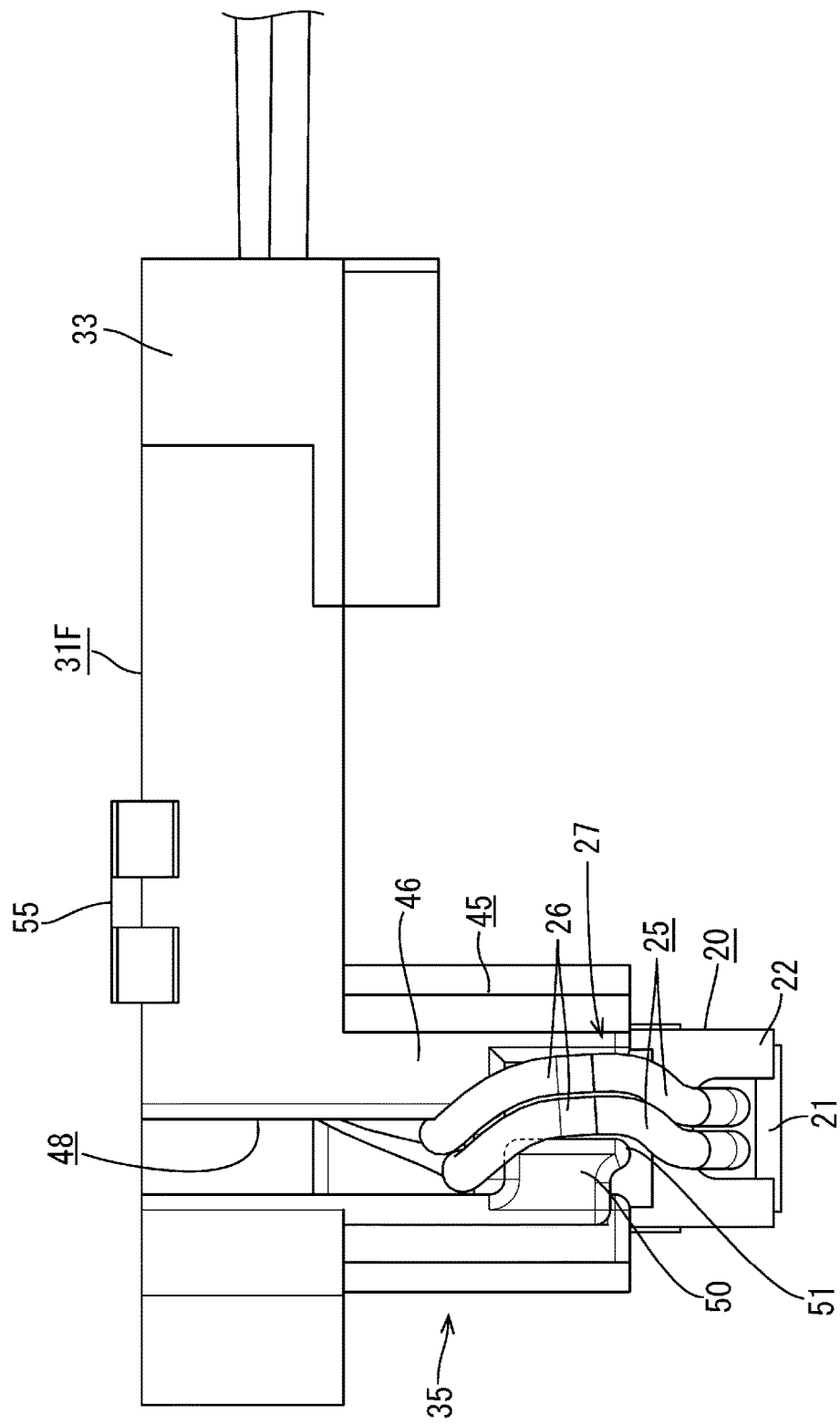
FIG. 14 is a front view of the state according to FIG. 13.
Figure 15:
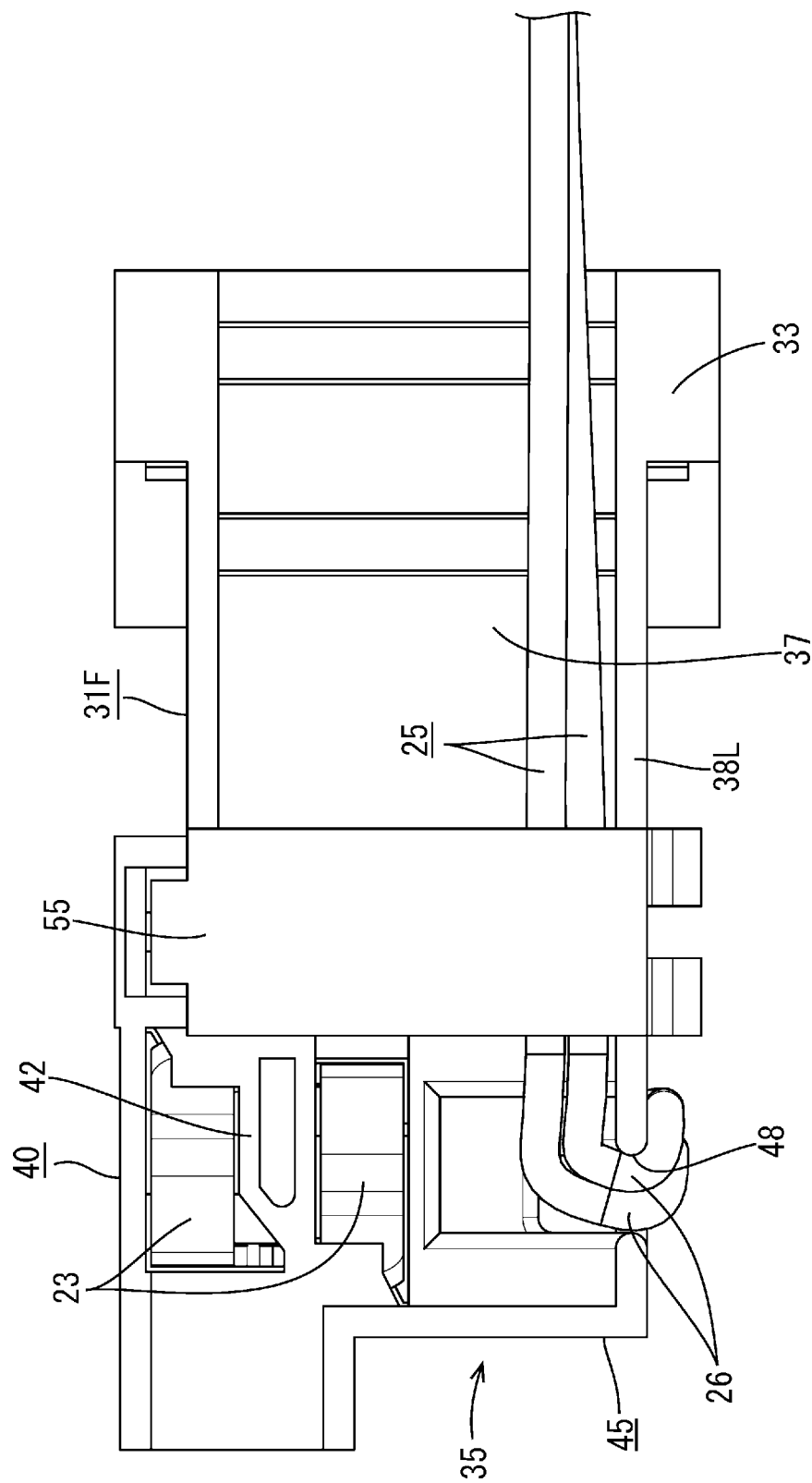
FIG. 15 is a plan view of the state according to FIG. 13.

After the thermistor electrical wires 25 are routed in this manner, the portions of the base ends of the thermistor electrical wires 25 that are latched on the lower edge of the temporary latching piece 50 are moved in an arrow x direction in FIG. 10 so as to pass over the protrusion 51, that is, the portions are moved away from the temporary latching piece 50. As shown in FIGS. 13 to 15, the tensioned portions that are latched on the temporary latching piece 50 become loose, and so-called excess length portions 26 having a constant length are formed due to these loose portions.

Also, the binding band 60 is mounted at the midpoint of the thermistor electrical wires 25 routed along the routing path 39 located on the inner side of the left wall 38L, and this binding band 60 is fit between the pair of the support columns 66 that constitute the electrical wire pressing portion 65, and thereby the thermistor electrical wires 25 routed along the routing path 39 are positioned in the form in which their movement in the front-rear direction is restricted. Thus, a decrease in the length of the above-described excess length portions 26 and an increase in the length thereof due to the thermistor electrical wires 25 moving rearward or frontward are prevented, that is, the excess length portions 26 having a constant length are ensured.

The case where the thermistor 20 is mounted on the rear member 31R will be described. Similarly to the above-described front member 31F, after the thermistor 20 is accommodated in the accommodation portion 40 of the thermistor holding portion 35, the thermistor electrical wires 25 that are drawn frontward from the thermistor 20 are wrapped around the lower edge of the temporary latching piece 50, bent upward, and then inserted into the electrical wire extension portion 45 so as to pass through the electrical wire insertion hole 48. Thereafter, as shown in FIG. 19, the thermistor electrical wires 25 are temporarily routed frontward, which is the opposite direction, so as to extend along the routing path 39 located on the inner side of the left wall 38L that extends from the rear member 31R to the middle member 31M while the thermistor electrical wires 25 are made tense by being slightly pulled.

Thereafter, positions of the temporarily routed thermistor electrical wires 25 that correspond to a predetermined electrical wire pressing portion 65 (on the right in FIG. 19 are bound by the binding band 60. Then, by pushing the thermistor electrical wires 25 between that electrical wire pressing portion 65 and the left wall 38L while fitting the binding band 60 (rounded band portion 62) between the two support columns 66 of the electrical wire pressing portion 65, the thermistor electrical wires 25 are routed frontward, which is the opposite direction, along the routing path 39 located on the inner side of the left wall 38L in a state in which the thermistor electrical wires 25 are retained.

Then, the thermistor electrical wires 25 are folded rearward at a relatively large bending radius (folded portions 29) in front of the electrical wire pressing portion 65, are then routed rearward along the right portion side (top of FIG. 19) in the electrical wire routing path 37, and are drawn from the guide path 71 through the outlet path 70 to the outside. That is, the front portions of the folded portions 29 of the thermistor electrical wires 25 are substantially immovably held on the electrical wire routing path 37 by the holding means 69 constituted by the binding band 60 and the electrical wire pressing portion 65.

With the thermistor electrical wires 25 routed in this manner, if a tensile force is applied to the thermistor electrical wires 25 from the outside, for example, the tensile force is absorbed while the folded portions 29 undergo elastic deformation.

After the thermistor electrical wires 25 are routed as described above, similarly to the front member 31F, portions at the base ends of the thermistor electrical wires 25 that are latched on the lower edge of the temporary latching piece 50 are moved away therefrom, and thus the tensioned portions that were latched on the temporary latching piece 50 become loose, and so-called excess length portions 26 having a constant length are formed due to these loose portions.

As described above, the thermistors 20 are mounted on the mounting member 30 and the thermistor electrical wires 25 are routed, and thereby assembly of the temperature detection module HM is complete. As shown in FIGS. 1 to 4, the temperature detection module HM assembled in this manner is positioned and mounted at a predetermined position on the upper surface of the electric cell group 10. At this time, the thermistors 20 receive the biasing force of the biasing springs 23 and are elastically pressed against the upper surface of the corresponding electric cells 11.

On the other hand, the terminal ends on the opposite side of the thermistor electrical wires 25 drawn from the outlet path 70 of the electrical wire routing path 37 are connected to an ECU (Electronic Control Unit) (not shown) or the like, and thereby a temperature detection system for detecting the temperature of the electric cell 11 is constructed.

According to the temperature detection module HM of the present embodiment, effects such as those described below can be obtained.

In the case of constructing a structure in which the thermistor 20 is held by the thermistor holding portion 35 and then the thermistor electrical wires 25 drawn from the thermistor 20 are routed in the electrical wire routing path 37, the base ends (drawing ends) of the thermistor electrical wires 25 are provided with the excess length portion 26 having a constant length, and the midpoints of the thermistor electrical wires 25 routed along the electrical wire routing path 37 (routing path 39) are held by the holding means 69 constituted by the binding band 60 and the electrical wire pressing portion 65.

Because the midpoints of the thermistor electrical wires 25 are held on the electrical wire routing path 37 (routing path 39), even if a tensile force or a pushing force is applied to the thermistor electrical wires 25, the tensile force or the pushing force is blocked at the held portion, the excess length portions 26 that are provided at the base ends of the thermistor electrical wires 25 in advance are not influenced, and constant lengths thereof are ensured.

Thus, the movement amount of the thermistor 20 required when the thermistor 20 comes into contact with or separates from the electric cell 11 is reliably absorbed by the excess length portions 26, and thereby the movement of the thermistor 20 is secured without subjection to loads from the thermistor electrical wires 25, and as a result of this, when the thermistor 20 receives the biasing force of the biasing springs 23 and comes into contact with the electric cell 11, a stable contact pressure can be obtained.

When the excess length portions 26 are formed at the base ends of the thermistor electrical wires 25, the thermistor electrical wires 25 drawn from the thermistors 20 are folded around the temporary latching piece 50 so as to be pulled back toward the thermistor 20, and then guided to the electrical wire extension portion 45 through the electrical wire insertion hole 48, and routed in the electrical wire routing path 37 (routing path 39), and loose portions are provided by moving the portions of the thermistor electrical wires 25 that are latched on the temporary latching piece 50 away from the temporary latching piece 50, and thereby the excess length portions 26 are formed. Thus, it is possible to reliably form the excess length portions 26 having a constant length.

Also, as shown in FIGS. 13 and 14, with the routing structure on the base end side of the thermistor electrical wires 25, which are drawn from the thermistor 20, form the excess length portions 26, and face the entrance of the electrical wire routing path 37, the thermistor electrical wires 25 are drawn frontward from the thermistor 20, bent upward, and folded backward (folded portions 27).

Thus, when the thermistor 20 is bought into contact with the upper surface of the corresponding electric cell 11, in addition to elastic contraction of the biasing springs 23, the thermistor 20 is brought into contact therewith while the folded portions 27 of the thermistor electrical wires 25 undergo elastic deformation such that the upper and lower sides thereof approximately approach each other, restoring elastic forces of the folded portions 27 are applied thereto, and thus the thermistor 20 is tightly pressed against the upper surface of the electric cell 11. As a result, a stable contact state can be obtained between the thermistors 20 and the electric cells 11.

The thermistor electrical wires 25 drawn from the thermistors 20 mounted on the rear member 31R face the entrance side of the electrical wire routing path 37 and are routed in the form of being folded toward the exit side in the middle, whereas the positions of the thermistor electrical wires 25 that are in front of the folded portions 29 are held on the electrical wire routing path 37 (routing path 39) by the holding means 69 constituted by the binding band 60 and the electrical wire pressing portion 65. With this structure, when a tensile force is applied to the thermistor electrical wires 25 from the outside, the tensile force is reduced while the folded portions 29 deform. An excess load is prevented from being applied to the positions at which the thermistor electrical wires 25 are held by the holding means 69.

Other Embodiments

The technology disclosed in this specification is not merely limited to the embodiments described above using the foregoing description and drawings, and embodiments such as the following are also encompassed in the technical scope of the present invention.

It is possible to detect the temperature of any number of the electric cells that constitute the electric cell group, and in this case, it is sufficient that the thermistor mounting member is provided with the same number of thermistor holding portions.

As partially described, the number of divisions of the thermistor mounting member may be any number, and the number of types of division mounting members having different shapes may also be any number.

Moreover, the technology disclosed in this specification is applicable to the case where the thermistor mounting member is not divided and is formed of one piece.

The temporary latching portion provided in the thermistor holding portion is not limited to having a structure in which the temporary latching piece is provided in the electrical wire insertion hole described in the above-described embodiment, and may have another structure as long as the base ends of the thermistor electrical wires drawn from the thermistor can be latched in a manner of being capable of being unlatched in a form in which the base ends are pulled back toward the thermistors.

The binding tool for binding the midpoints of the thermistor electrical wires is not limited to a binding band described in the above-described embodiment, and may have another structure as long as the binding tool engages with the electrical wire pressing portion such that movement thereof is restricted or the thermistor electrical wires are held.

On the other hand, the restriction portion provided in the electrical wire routing path in order to engage with the binding tool for the thermistor electrical wires is not limited to the electrical wire pressing portion having the structure described in the above-described embodiment, and may have another structure.

Although the structure in which the thermistor electrical wires are drawn from one peripheral surface of the thermistor was described in the above-described embodiment, the thermistor electrical wires may have another structure, such as being drawn from the upper surface thereof.

In the above-described embodiment, the case was described as an example in which the holding member is arranged at a position that is located just in front of the folded portions in the routing structure of the thermistor electrical wires drawn from the thermistor mounted on the exit side of the electrical wire routing path, but the position at which the holding member is arranged need only be midpoints of the portions of the thermistor electrical wires that are routed toward the entrance side of the electrical wire routing path, and according to this arrangement position, a tensile force from the outside is reduced utilizing deformation of the folded portions, and an excess load is prevented from being applied to the position at which the thermistor electrical wires are held.

Although the case where the thermistor holding portion and the electrical wire routing path are provided integrally was described in the above-described embodiment, a configuration is possible in which the thermistor holding portion and the electrical wire routing path are included separately from each other.

Although an electric cell was described as an example of the power storage element in the above-described embodiment, the power storage element may be a capacitor.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

HM Temperature detection module
10 Electric cell group (power storage element group)
11 Electric cell (power storage element)
20 Thermistor
25 Thermistor electrical wire
26 Excess length portion
27 Folded portion
29 Folded portion
30 Thermistor mounting member
35 Thermistor holding portion
37 Electrical wire routing path
39 Routing path
50 Temporary latching piece (temporary latching portion)
60 Binding band (binding tool)
65 Electrical wire pressing portion (restriction portion)
69 Holding means

The invention claimed is:

1. A temperature detection module that is to be mounted on a power storage element group obtained by connecting a plurality of power storage elements side-by-side, the temperature detection module comprising:
a thermistor configured to be brought into contact with a power storage element among the power storage elements and detect a temperature of the power storage element;
a thermistor electrical wire that is drawn from the thermistor;
a thermistor holding portion configured to hold the thermistor movably in a direction in which the thermistor comes into contact with and separates from the power storage element in a form in which the thermistor is biased to move toward the power storage element; and
an electrical wire routing path in which the thermistor electrical wire is routed in one direction,
wherein the electrical wire routing path is provided with a holding means for holding a midpoint of the thermistor electrical wire that is drawn from the thermistor and is routed along the electrical wire routing path in a form in which a drawing end of the thermistor electrical wire is provided with an excess length portion having a predetermined length in order to allow movement of the thermistor, and
the thermistor electrical wire is routed in a form in which the thermistor electrical wire is drawn from a peripheral surface of the thermistor in a direction away from the electrical wire routing path, and then folded toward the electrical wire routing path.

2. The temperature detection module according to claim 1,
wherein the holding means is configured by binding the midpoint of the thermistor electrical wire routed in the electrical wire routing path with a binding tool, and providing the electrical wire routing path with a restriction portion configured to engage with the binding tool and restrict movement of the binding tool along the electrical wire routing path.

3. The temperature detection module according to claim 1,
wherein the thermistor holding portion is provided with a temporary latching portion configured to latch the drawing end of the thermistor electrical wire in a manner of being capable of being unlatched in a form in which the drawing end is pulled back toward the thermistor.

4. The temperature detection module according to claim 1,
wherein the thermistor electrical wire drawn from the thermistor mounted on an exit side of the electrical wire routing path is routed in a form of being provided with a folded portion in which the thermistor electrical wire faces an entrance side of the electrical wire routing path and is then folded toward the exit side at a midpoint, and the midpoint of a portion of the thermistor electrical wire that is routed toward the entrance side of the electrical wire routing path is held by the holding means.

5. A temperature detection module that is to be mounted on a power storage element group obtained by connecting a plurality of power storage elements side-by-side, the temperature detection module comprising:

a thermistor configured to be brought into contact with a power storage element among the power storage elements and detect a temperature of the power storage element;

a thermistor electrical wire that is drawn from the thermistor;

a thermistor holding portion configured to hold the thermistor movably in a direction in which the thermistor comes into contact with and separates from the power storage element in a form in which the thermistor is biased to move toward the power storage element; and an electrical wire routing path in which the thermistor electrical wire is routed in one direction, wherein the electrical wire routing path is provided with a holding means for holding a midpoint of the thermistor electrical wire that is drawn from the thermistor and is routed along the electrical wire routing path in a form in which a drawing end of the thermistor electrical wire is provided with an excess length portion having a predetermined length in order to allow movement of the thermistor, and the thermistor holding portion is provided with a temporary latching portion configured to latch the drawing end of the thermistor electrical wire in a manner of being capable of being unlatched in a form in which the drawing end is pulled back toward the thermistor.

* * * * *